(12) United States Patent
Saito

(10) Patent No.: US 9,621,860 B2
(45) Date of Patent: Apr. 11, 2017

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventor: Makiko Saito, Tokyo (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 14/674,672

(22) Filed: Mar. 31, 2015

(65) Prior Publication Data

US 2015/0281618 A1    Oct. 1, 2015

(30) Foreign Application Priority Data

Apr. 1, 2014  (JP) ................ 2014-075721

(51) Int. Cl.
*H04N 9/31*   (2006.01)
*G01S 7/486*  (2006.01)
*G01S 17/89*  (2006.01)
*H04N 5/3745* (2011.01)

(52) U.S. Cl.
CPC ............. *H04N 9/31* (2013.01); *G01S 7/4863* (2013.01); *G01S 7/4865* (2013.01); *G01S 17/89* (2013.01); *H04N 5/37452* (2013.01)

(58) Field of Classification Search
CPC .............. G01S 7/4865; H04N 13/0296; H04N 5/37452; H01L 27/14612
See application file for complete search history.

(56) References Cited

U.S. PATENT DOCUMENTS 6,317,154 B2\* 11/2001 Beiley ................. 250/208.1
2013/0181119 A1\* 7/2013 Bikumandla ..... H01L 27/14612
                                                            250/214.1

FOREIGN PATENT DOCUMENTS

JP    2004-294420 A    10/2004
JP    2010-213231 A     9/2010

\* cited by examiner

*Primary Examiner* — Ahmed A Berhan
(74) *Attorney, Agent, or Firm* — Cowan, Liebowitz & Latman, P.C.

(57) ABSTRACT

An image capturing apparatus comprises a solid-state image sensor including a pixel area where a plurality of unit pixels are arranged, each of the unit pixels including a photoelectric conversion portion, a first charge holding portion, a first charge transfer portion, a second charge holding portion, and a second charge transfer portion, a light projection unit, and a control unit configured to control to set the second charge transfer portion in an OFF state synchronized with a light projection operation by the light projection unit while keeping the first charge transfer portion in an ON state after controlling the photoelectric conversion portion to perform photoelectric conversion, and setting the first charge transfer portion and the second charge transfer portion in the ON states.

14 Claims, 10 Drawing Sheets

IMAGE CAPTURING APPARATUS AND CONTROL METHOD THEREOF, AND STORAGE MEDIUM

BACKGROUND OF THE INVENTION

Field of the Invention

The present invention relates to an image capturing apparatus capable of obtaining distance information for each pixel.

Description of the Related Art

Recently, a solid-state image sensor not only performing capturing but also having various functions added has been proposed.

As one of the functions added to the solid-state image sensor, the function of obtaining a distance image using a TOF (Time-of-Flight) method has received attention. The TOF method derives a distance to a target object by projecting pulsed light from a light source to the target object and then measuring a time (the delay time of pulsed light) that has elapsed before reflected light from the target object reaches an observation point. It is known that the speed of light is $3\times10^8$ [m/S]. Therefore, for example, if the delay time is 2 [nS] when the observation point and the light source are placed at the same point, it is obvious that the total flight distance of light is 60 [cm] and the distance to the target object is 30 [cm] which is half the total flight distance. The solid-state image sensor capable of obtaining the distance image by making use of the principle of this TOF method to obtain distance information to the object for each pixel has been proposed.

Japanese Patent Laid-Open No. 2004-294420 discloses a solid-state image sensor including a plurality of charge accumulation portions which accumulate signal charges from one light receiving element and a transfer switch which controls charge transfer from the light receiving element with respect to each charge accumulation portion. In such a solid-state image sensor, the transfer switches corresponding to the two charge accumulation portions are controlled alternately to distribute charges generated in the light receiving element upon receiving reflected pulsed light at the two charge accumulation portions. Then, the distance information for each pixel can be obtained by obtaining the ratio of the charges of the two charge accumulation portions.

Further, Japanese Patent Laid-Open No. 2010-213231 discloses a solid-state image sensor capable of obtaining distance information in the arrangement having one transfer switch and one charge accumulation portion per pixel by distributing charges not to each pixel but to two pixel groups, for example, pixels in an even numbered row and an odd numbered row, respectively.

In the conventional technique disclosed in Japanese Patent Laid-Open No. 2004-294420 or Japanese Patent Laid-Open No. 2010-213231, two separate transfer switches are driven to distribute charges to the plurality of accumulation portions. It is therefore necessary to match the driving timings of the two switches accurately in order to distribute the charges accurately.

However, if the threshold variations, shifts in the transfer pulse, or the like of the transfer switches are generated, an error occurs in a timing for switching a charge distribution destination. As a result, accurate signal charges cannot be obtained and wrong distance information may be derived.

SUMMARY OF THE INVENTION

The present invention has been made in consideration of the above-described problems, and provides a solid-state image sensor capable of obtaining accurate distance information and obtaining both of a normal captured image and a distance image.

According to the first aspect of the present invention, there is provided an image capturing apparatus comprising: a solid-state image sensor including a pixel area where a plurality of unit pixels are arranged, each of the unit pixels including a photoelectric conversion portion configured to convert incident light into charges, a first charge holding portion capable of accumulating the charges generated in the photoelectric conversion portion, a first charge transfer portion provided between the photoelectric conversion portion and the first charge holding portion and configured to turn on and off an electrical connection between the photoelectric conversion portion and the first charge holding portion, a second charge holding portion capable of accumulating the charges generated in the photoelectric conversion portion, and a second charge transfer portion provided between the first charge holding portion and the second charge holding portion and configured to turn on and off an electrical connection between the first charge holding portion and the second charge holding portion; a light projection unit configured to project light to an object; and a control unit configured to control the solid-state image sensor and the projection unit to set the second charge transfer portion in an OFF state synchronized with a light projection operation by the light projection unit while keeping the first charge transfer portion in an ON state after controlling the photoelectric conversion portion to perform photoelectric conversion, and setting the first charge transfer portion and the second charge transfer portion in the ON states.

According to the second aspect of the present invention, there is provided an image capturing apparatus comprising: a solid-state image sensor including a pixel area where a plurality of unit pixels are arranged, each of the unit pixels including a photoelectric conversion portion configured to convert incident light into charges, a first charge holding portion capable of accumulating the charges generated in the photoelectric conversion portion, a first charge transfer portion provided between the photoelectric conversion portion and the first charge holding portion and configured to turn on and off an electrical connection between the photoelectric conversion portion and the first charge holding portion, a second charge holding portion capable of accumulating the charges generated in the photoelectric conversion portion, and a second charge transfer portion provided between the photoelectric conversion portion and the second charge holding portion and configured to turn on and off an electrical connection between the photoelectric conversion portion and the second charge holding portion; a light projection unit configured to project light to an object; and a control unit configured to control the solid-state image sensor and the projection unit to set the second charge transfer portion in an OFF state synchronized with a light projection operation by the light projection unit while keeping the first charge transfer portion in an ON state after controlling the photoelectric conversion portion to perform photoelectric conversion, and setting the first charge transfer portion and the second charge transfer portion in the ON states.

According to the third aspect of the present invention, there is provided a control method of controlling an image capturing apparatus including a solid-state image sensor including a pixel area where a plurality of unit pixels are arranged, each of the unit pixels including a photoelectric conversion portion configured to convert incident light into charges, a first charge holding portion capable of accumulating the charges generated in the photoelectric conversion portion, a first charge transfer portion provided between the photoelectric conversion portion and the first charge holding portion and configured to turn on and off an electrical connection between the photoelectric conversion portion and the first charge holding portion, a second charge holding portion capable of accumulating the charges generated in the photoelectric conversion portion, and a second charge transfer portion provided between the first charge holding portion and the second charge holding portion and configured to turn on and off an electrical connection between the first charge holding portion and the second charge holding portion, and a light projection unit configured to project light to an object, the method comprising: a control step of controlling the solid-state image sensor and the light projection unit to set the second charge transfer portion in an OFF state synchronized with a light projection operation by the light projection unit while keeping the first charge transfer portion in an ON state after controlling the photoelectric conversion portion to perform photoelectric conversion, and setting the first charge transfer portion and the second charge transfer portion in the ON states.

According to the fourth aspect of the present invention, there is provided a control method of controlling an image capturing apparatus including a solid-state image sensor including a pixel area where a plurality of unit pixels are arranged, each of the unit pixels including a photoelectric conversion portion configured to convert incident light into charges, a first charge holding portion capable of accumulating the charges generated in the photoelectric conversion portion, a first charge transfer portion provided between the photoelectric conversion portion and the first charge holding portion and configured to turn on and off an electrical connection between the photoelectric conversion portion and the first charge holding portion, a second charge holding portion capable of accumulating the charges generated in the photoelectric conversion portion, and a second charge transfer portion provided between the photoelectric conversion portion and the second charge holding portion and configured to turn on and off an electrical connection between the photoelectric conversion portion and the second charge holding portion, and a light projection unit configured to project light to an object, the method comprising: a control step of controlling the solid-state image sensor and the light projection unit to set the second charge transfer portion in an OFF state synchronized with a light projection operation by the light projection unit while keeping the first charge transfer portion in an ON state after controlling the photoelectric conversion portion to perform photoelectric conversion, and setting the first charge transfer portion and the second charge transfer portion in the ON states.

Further features of the present invention will become apparent from the following description of exemplary embodiments with reference to the attached drawings.

DESCRIPTION OF THE EMBODIMENTS

Embodiments of the present invention will be described below in detail with reference to the accompanying drawings. First, an arrangement common to each embodiment of the present invention will be described.

<Arrangement of Image Capturing Apparatus>

Figure 1A:
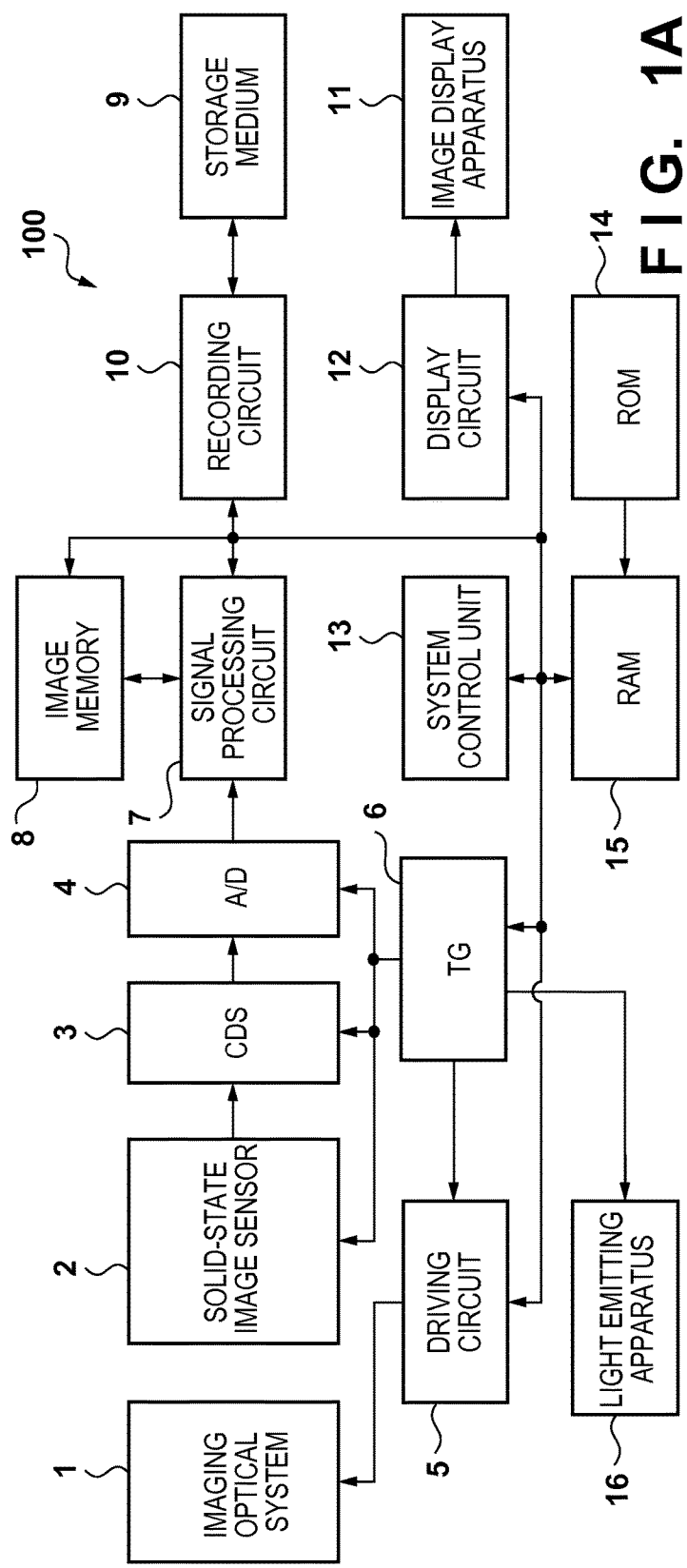
FIGS. 1A to 1C are block diagrams showing the arrangement of an image capturing apparatus common to each embodiment of the present invention.

The arrangement of an image capturing apparatus serving as an image capturing system according to the embodiments of the present invention will be described with reference to FIGS. 1A to 1C. FIG. 1A is a block diagram for explaining an example of the entire arrangement of the image capturing apparatus according to the embodiments of the present invention.

An image capturing apparatus 100 includes an imaging optical system 1 including a lens and a stop, and a solid-state image sensor 2. A CDS circuit 3 processes an analog signal from the solid-state image sensor 2. An A/D converter 4 converts the image data of the analog signal into a digital signal. A timing signal generation circuit (TG) 6 generates timing signals which operate the solid-state image sensor 2, the CDS circuit 3, the A/D converter 4, a driving circuit 5, and a light emitting apparatus 16. The driving circuit 5 drives the optical system 1.

A captured image data is temporarily stored in an image memory 8, and undergoes various signal processes including white balance correction and gamma correction by a signal processing circuit 7. The image data which has undergone the processes is saved in a storage medium 9 via a recording circuit 10. An image display apparatus 11 displays the image data which has undergone the signal processes via a display circuit 12. A system control unit 13 is formed by, for example, a CPU which controls the entire image capturing apparatus. A ROM 14 stores a program which describes a control method performed by the system control unit 13, and control data such as a parameter or a table used when executing the program. The program, the control data, and correction data stored in the ROM 14 are transferred to and then stored in a RAM 15, and used when the system control unit 13 controls the image capturing apparatus.

<Arrangement of Light Emitting Apparatus>

Figure 1B:
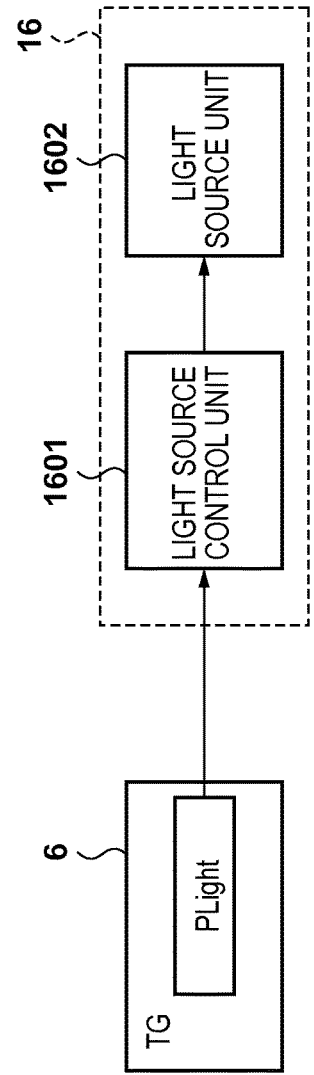

FIG. 1B is a block diagram showing the arrangement of the light emitting apparatus 16 in FIG. 1A. The light emitting apparatus 16 is a light projection unit which projects pulsed light to an object, and includes a light source control unit 1601 and a light source unit 1602. The light source control unit 1601 performs flickering control on the light source unit 1602 in accordance with a light emission control pulse PLight supplied from the TG 6. Each embodiment to be described below assumes that the light source control unit 1601 drives the light source unit such that the light emission control pulse PLight is on at the time of H and off at the time of L.

<Arrangement of Solid-State Image Sensor>

Figure 1C:
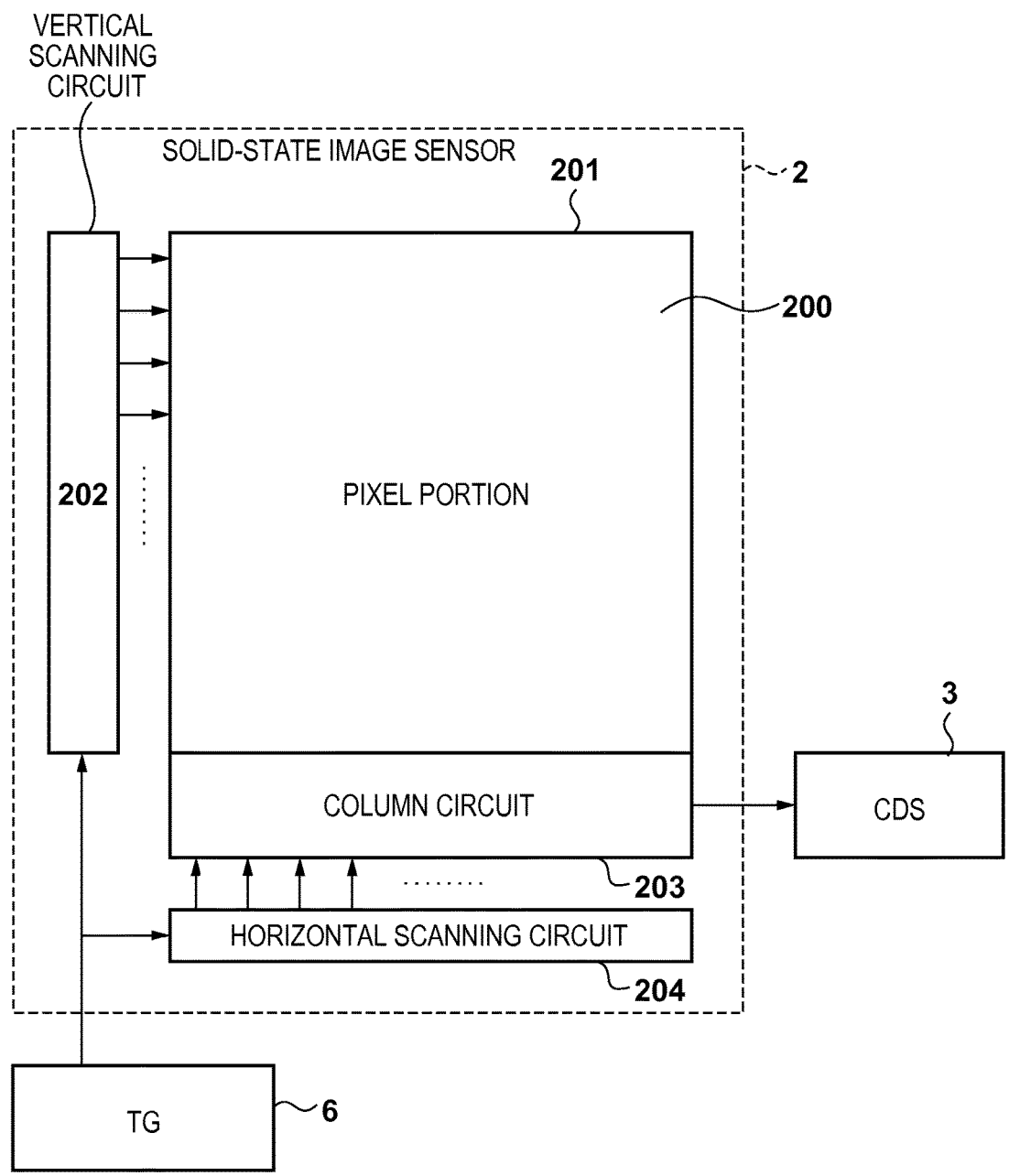

FIG. 1C is a block diagram showing the arrangement of the solid-state image sensor 2 in FIG. 1A.

As shown in FIG. 1C, the solid-state image sensor 2 includes a pixel portion 201 formed by a plurality of unit pixels 200 arranged in a matrix, a vertical scanning circuit 202 which supplies various driving pulses for controlling the unit pixels 200 to the pixel portion 201 and controls an operation of reading out a signal from each unit pixel 200 upon receiving the timing signal from the TG 6, a column circuit 203 including a column memory (not shown) which samples and holds a pixel signal output from each unit pixel 200, and a horizontal scanning circuit 204 which generates a driving pulse for controlling signal output from the column circuit 203 to the CDS 3 at the subsequent stage upon receiving the timing signal from the TG 6.

Assume that the vertical scanning circuit can control the plurality of unit pixels 200 arranged in the pixel portion 201 for each predetermined readout unit. Assume that, for example, in each embodiment to be described below, the unit pixels are controlled for each row by supplying a driving pulse common to the pixels arranged on the same row out of the plurality of unit pixels arranged in a matrix.

First Embodiment

The arrangement of a unit pixel of a solid-state image sensor and a method of driving the solid-state image sensor according to the first embodiment of the present invention will be described below with reference to the accompanying drawings.

<Arrangement of Unit Pixel>

Figure 2A:
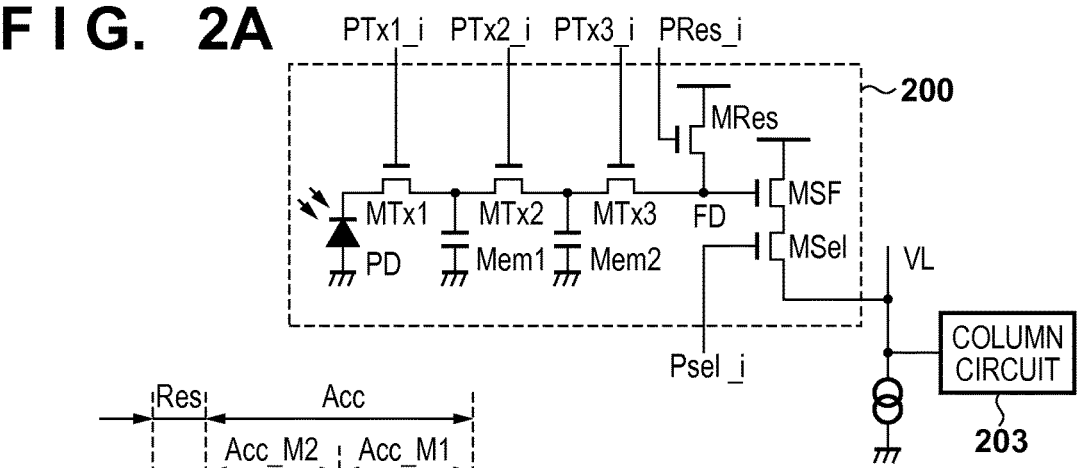
FIGS. 2A to 2C are an equivalent circuit diagram of the unit pixel of a solid-state image sensor and timing charts showing a method of driving the solid-state image sensor when obtaining a distance image according to the first embodiment of the present invention.

FIG. 2A is an equivalent circuit diagram showing the arrangement of a unit pixel 200 of the solid-state image sensor according to the first embodiment of the present invention. A photoelectric conversion element PD receives incident light, and generates and accumulates signal charges corresponding to a receiving amount of that light. An intra-pixel memory Mem1 (first charge holding portion) and an intra-pixel memory Mem2 (second charge holding portion) hold (can accumulate) charge signals generated in the photoelectric conversion element PD. The first intra-pixel memory Mem1 and the second intra-pixel memory Mem2 are provided in series with respect to the photoelectric conversion element PD.

A transfer switch MTx1 (first charge transfer portion) transfers the signal charges generated in the photoelectric conversion element PD to the first intra-pixel memory Mem1. Furthermore, a transfer switch MTx2 (second charge transfer portion) provided between the first intra-pixel memory Mem1 and the second intra-pixel memory Mem2 transfers (electrically connects) the signal charges held in the first intra-pixel memory Mem1 to the second intra-pixel memory Mem2.

Assume that each of the first and the second intra-pixel memories adopts, by generating a buried capacitor or the like, an arrangement unsusceptible to noise such as a dark current in order to achieve "global electronic shutter driving" to be described later even if long-term charge accumulation is performed. A floating diffusion portion (FD: third charge holding portion) holds transferred charges. A transfer switch MTx3 (third charge transfer portion) transfers the signal charges held in the second intra-pixel memory Mem2 to the FD portion.

A reset switch MRes (reset portion) is connected to the FD portion, and resets the signal charges held in the FD portion, the first and the second intra-pixel memories Mem1 and Mem2, and PD. An amplifier MOS MSF (conversion/amplification portion) is connected to a current source provided for each vertical output line VL, forms a source follower circuit, and outputs a voltage signal as a pixel signal in accordance with the charges held in the FD portion. Further, a selection switch MSel (selection portion) controls a connection between the signal output node of an amplifier MOS and the vertical output line VL provided for each pixel column, and selects a pixel group i which transmits, via the vertical output line VL, the voltage signal output from the amplifier MOS to a column circuit 203 at the subsequent stage.

Each above-described switch provided in the unit pixel 200 is controlled by each driving pulse supplied from a vertical scanning circuit 202. For example, the transfer switch MTx1 is controlled by a first transfer pulse $PTx1\_i$, the transfer switch MTx2 is controlled by a second transfer pulse $PTx2\_i$, and the transfer switch MTx3 is controlled by a third transfer pulse $PTx3\_i$. Also, the reset switch MRes is controlled by a reset pulse $PRes\_i$ and the selection switch MSel is controlled by a selection pulse $PSel\_i$. Assume that a subscript i after each pulse name indicates a driving pulse supplied to a unit pixel $200\_i$ on the ith row in the solid-state image sensor including the unit pixels arranged in a matrix.

<Operations of Accumulating and Reading Out Signal of Solid-State Image Sensor>

Figure 3A:
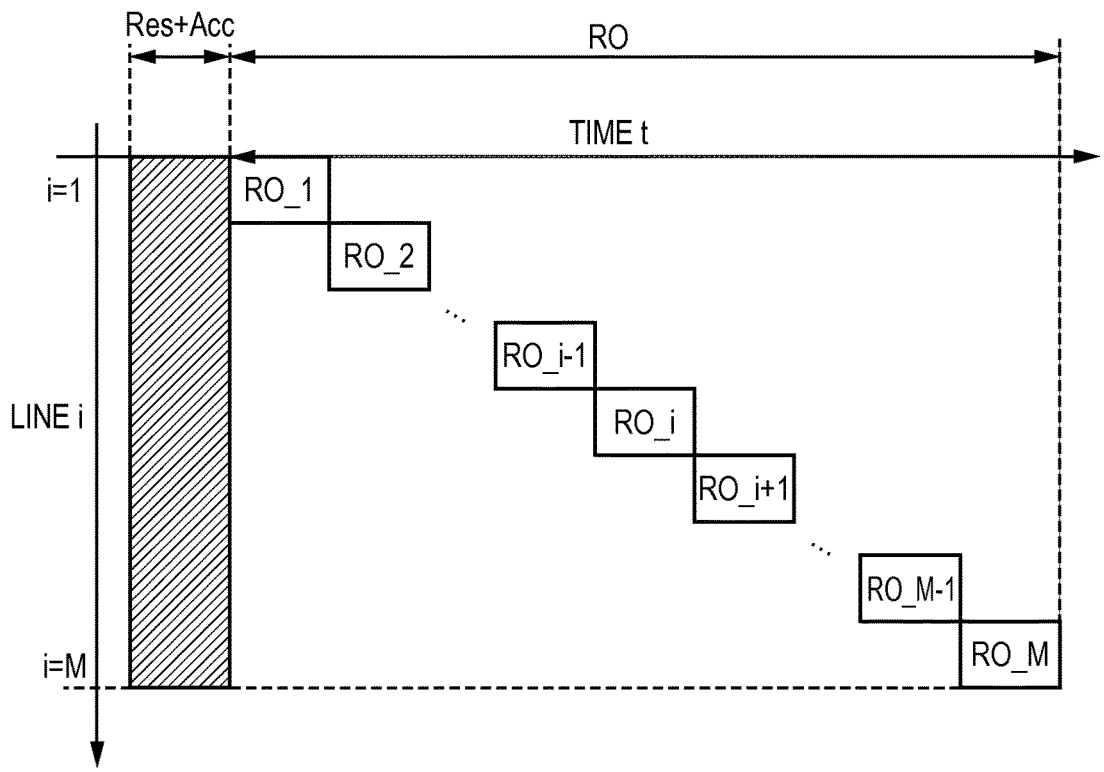
FIGS. 3A and 3B are schematic views showing an overview of entire operations of accumulating and reading out the signal of the solid-state image sensor common to each embodiment of the present invention.
Figure 3B:
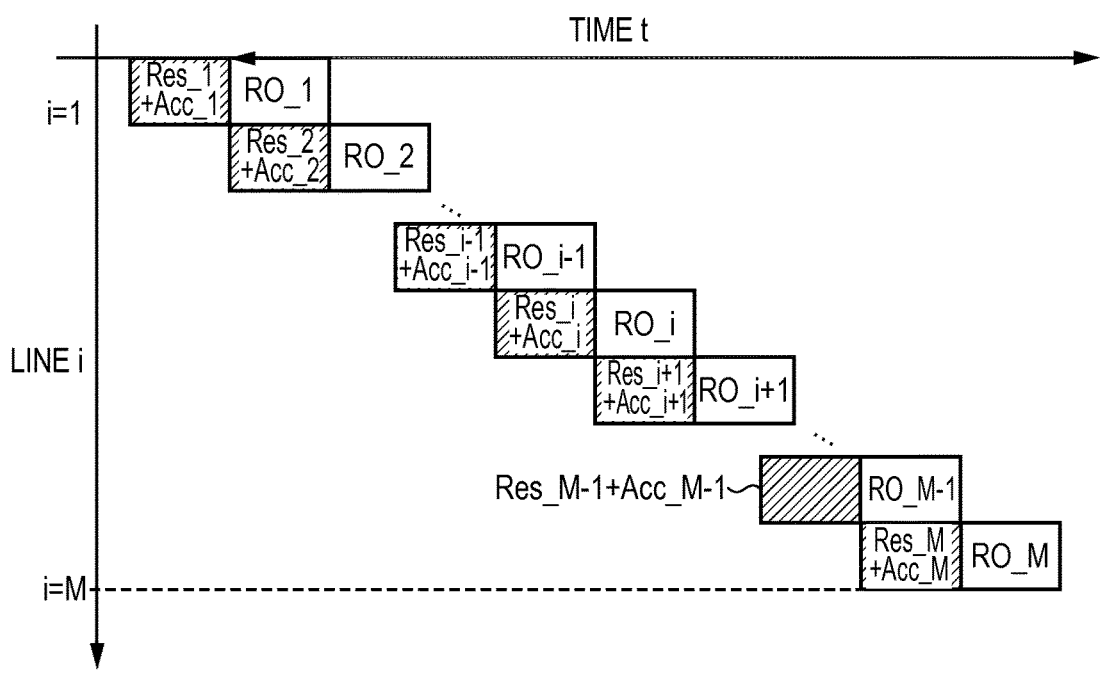

The overview of operations of accumulating and reading out the signal of the solid-state image sensor will now be described with reference to FIGS. 3A and 3B. FIGS. 3A and 3B show the time-series sequence of the signal accumulation/readout operations in each pixel group when the abscissa represents time t and the ordinate represents the pixel group i of the solid-state image sensor. Assume that the pixel group i indicates a pixel row on the ith row. In addition, the subscript i indicates an operation related to the unit pixel $200\_i$ on the ith row in the operations of accumulating and reading out the signal of the solid-state image sensor including the unit pixels arranged in a matrix.

The operations of accumulating and reading out the signal of the solid-state image sensor are roughly divided into those in a reset period Res, an accumulation period Acc, and a readout period RO. In the reset period Res, a reset operation of the signal charges accumulated in each unit pixel 200 is performed. In the accumulation period Acc, the signal charges are accumulated in each unit pixel 200. In the readout period RO, a voltage signal corresponding to the signal charges accumulated in each unit pixel 200 is read out to a column circuit 203, and sampled and held in the column memory of the column circuit 203 as a pixel signal of each pixel.

FIG. 3A shows the time-series sequence of the signal accumulation/readout operations in "global electronic shutter driving". In "global electronic shutter driving", the reset operations in the reset period Res and the signal accumulation operations in the accumulation period Acc are performed simultaneously for all the pixels. After that, in the readout period RO, a readout period $RO\_i$ for each predetermined pixel row unit is performed repeatedly while switching the pixel groups which perform readout operations. In the readout period $RO\_i$, the pixel signal is read out from each unit pixel on the pixel row i to the column circuit 203, and the pixel signal held in the column circuit 203 is output to the CDS 3.

FIG. 3B shows the time-series sequence of the signal accumulation/readout operations in "rolling shutter driving". In "rolling shutter driving", the signal accumulation/readout operations on the pixel row i are performed continuously in a reset period Res_i, an accumulation period Acc_i, and the readout period RO_i. Since such signal accumulation/readout operations on the pixel row i are performed repeatedly while switching the pixel groups which perform the readout operations, the accumulation period Acc_i is provided at a different time for each pixel row.

The signal accumulation/readout operations can be "rolling shutter driving" shown in FIG. 3B. In this embodiment, however, "global electronic shutter driving" which accumulates the pixel signals simultaneously for all the pixels in the accumulation period Acc as shown in FIG. 3A is performed by placing importance on simultaneity of the accumulation times of the signals.

<Driving Patterns of Solid-State Image Sensor and Light Emitting Apparatus when Obtaining Distance Image>

Figure 2B:
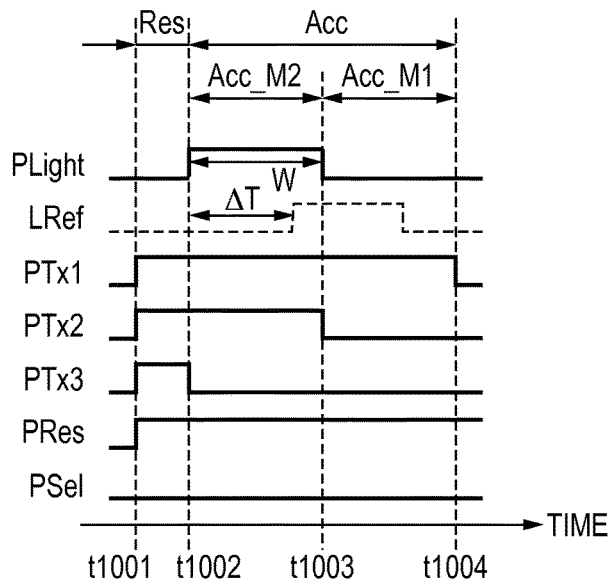
Figure 2C:
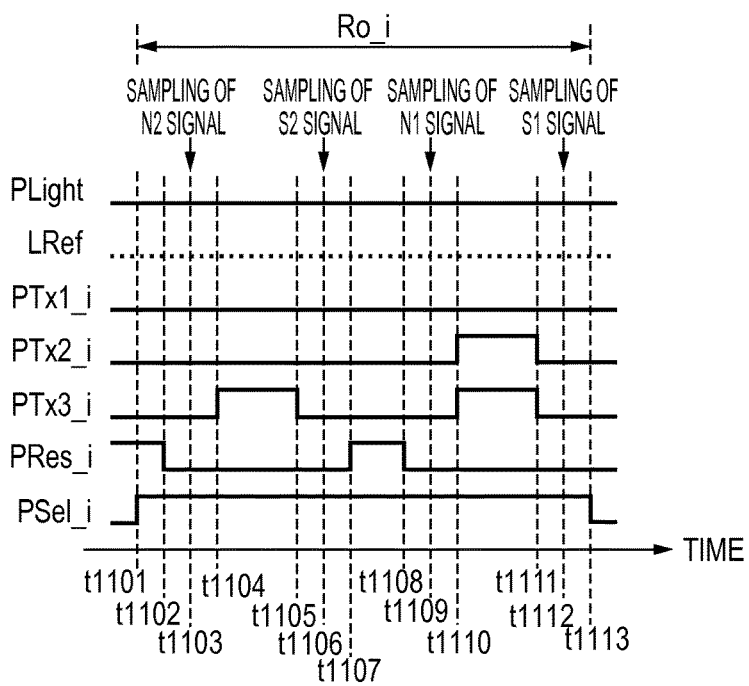

The driving patterns of the solid-state image sensor and a light emitting apparatus when obtaining a distance image will be described below with reference to timing charts shown in FIGS. 2B and 2C. FIGS. 2B and 2C are the timing charts of respective driving pulses supplied to each unit pixel 200 of the solid-state image sensor and a light emitting apparatus 16 when obtaining the distance image. Each timing chart will be described assuming that each switch is set in an ON state when each driving pulse is at H level, while each switch is set in an OFF state when each driving pulse is at L level. The accumulation period Acc when obtaining the distance image will also be described together with the operation of each unit pixel with reference to potential views shown in FIGS. 4B to 4D.

FIG. 2B is the timing chart showing the driving patterns of each driving pulse supplied to each unit pixel 200 of the solid-state image sensor and a light emission control pulse PLight supplied to the light emitting apparatus 16 in the reset period Res and the accumulation period Acc shown in FIG. 3A. Assume that the operations in the reset period Res and the accumulation period Acc are performed simultaneously for the pixels on all the rows, as shown in FIG. 3A.

First, a method of controlling the solid-state image sensor in the reset period Res will be described.

At time t1001, a reset pulse PRes, a first transfer pulse PTx1, a second transfer pulse PTx2, and a third transfer pulse PTx3 are set at H level. At this time, the reset switch MRes, the first transfer switch MTx1, the second transfer switch MTx2, and the third transfer switch MTx3 are set in the ON states. Then, charges accumulated in the PD, the first intra-pixel memory Mem1, the second intra-pixel memory Mem2, and the FD are reset.

At time t1002, the third transfer pulse PTx3 is set at L level, and the third transfer switch MTx3 is set in the OFF state. Therefore, the reset states of the PD, the first intra-pixel memory Mem1, and the second intra-pixel memory Mem2 are canceled, and the reset state of the FD is continued. The method of controlling the solid-state image sensor in the reset period Res has been described above.

Figure 4A:
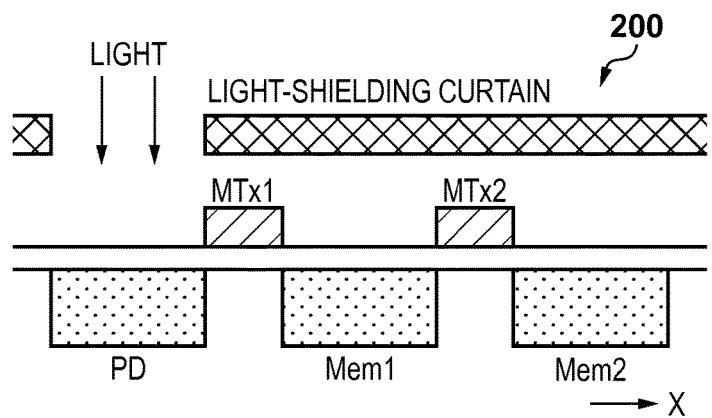
FIGS. 4A to 4D are a sectional view and potential views of the unit pixel according to the first embodiment of the present invention.
Figure 4B:
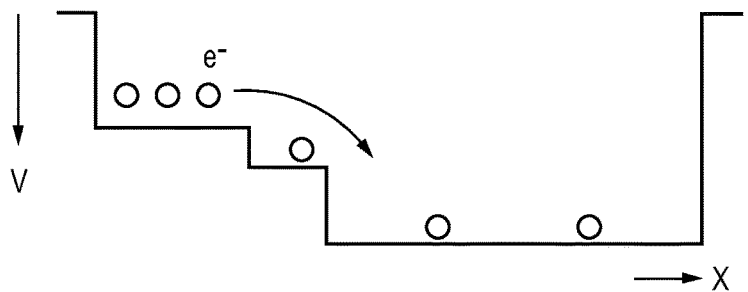
Figure 4C:
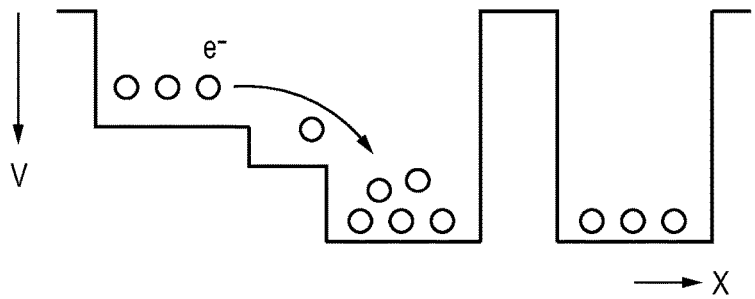
Figure 4D:
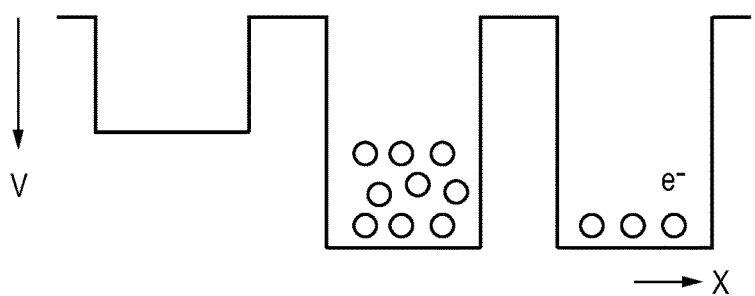

Next, a method of controlling the solid-state image sensor in the accumulation period Acc will be described. FIG. 4A is a sectional view of the unit pixel 200 whose equivalent circuit diagram is shown in FIG. 2A. FIGS. 4B to 4D correspond to the sectional view shown in FIG. 4A, and are potential views showing the potentials of the photoelectric conversion element PD, the transfer switch MTx1, the intra-pixel memory Mem1, the transfer switch MTx2, and the intra-pixel memory Mem2.

At time t1002, the first transfer pulse PTx1 and the second transfer pulse PTx2 are set at H level and, as shown in FIG. 4B, the charges generated in the PD are transferred to and then accumulated in the first intra-pixel memory Mem1 and the second intra-pixel memory Mem2. A period in which charges are transferred from the PD to both of the first intra-pixel memory Mem1 and the second intra-pixel memory Mem2 will be referred to as Acc_M2 hereinafter. Note that in the Acc_M2 period, both or one of the transfer switch MTx1 and the transfer switch MTx2 may be set in the OFF states to accumulate charges in the PD, and then set in the ON states again before time t1003 to transfer the charges to the intra-pixel memories Mem1 and Mem2.

At time t1003, the second transfer pulse PTx2 is set at L level and the second transfer switch MTx2 is set in the OFF state. At this time, as shown in FIG. 4C, charge transfer to the second intra-pixel memory Mem2 is terminated and charges Q2 that have been accumulated at this point of time are held in the second intra-pixel memory Mem2. Note that the first transfer pulse PTx1 is kept at H level and charge transfer to the first intra-pixel memory Mem1 is continued. A period in which charges are transferred from the PD to only the first intra-pixel memory Mem1 will be referred to as Acc_M1 hereinafter.

At time t1004, the first transfer pulse PTx1 is set at L level and the first transfer switch MTx1 is set in the OFF state. At this time, as shown in FIG. 4D, charge transfer to the first intra-pixel memory Mem1 is terminated and signal charges Q1 that have been accumulated at this point of time are held in the first intra-pixel memory Mem1. The method of controlling the solid-state image sensor in the accumulation period Acc has been described above.

During the accumulation period Acc, control of the solid-state image sensor and the light projection operation of the light emitting apparatus 16 shown in FIG. 1B are performed in synchronism with each other. More specifically, a period in which light projection from the light emitting apparatus is performed is provided in the period Acc_M2 in which the signal charges are transferred to both of the intra-pixel memories Mem1 and Mem2. In addition, a period in which light projection from the light emitting apparatus is not performed is provided in the period Acc_M1 in which charge transfer to the second intra-pixel memory Mem2 is terminated and the signal charges are transferred to only the first intra-pixel memory Mem1.

The period Acc_M2 is terminated at a timing, for example, after the light emitting apparatus 16 starts light projection and before the light emitting apparatus 16 terminates light projection. In this embodiment, as one example, a period between time t1002 and time t1003 corresponding to the period Acc_M2 is defined as the H level period of the light emission control pulse PLight supplied to the light emitting apparatus 16 and a period other than that period is defined as an L level period, as shown in FIG. 2B. While the light emission control pulse PLight is at H level, light projection is performed from the light emitting apparatus 16 to an object and the light projection ends at the moment when the light emission control pulse PLight is set at L level.

Light projected from the light emitting apparatus 16 is reflected by the object and enters each unit pixel 200 of a solid-state image sensor 2 via an imaging optical system 1 of an image capturing apparatus after a delay time ΔT corresponding to a distance L from the image capturing apparatus to the object. Reflected light LRef in FIG. 2B shows an example of a timing when reflected light from the object enters each unit pixel 200. Charges generated in the PD in accordance with the reflected light LRef which has entered each unit pixel 200 in the period Acc_M2 are accumulated in both of the first intra-pixel memory Mem1 and the second intra-pixel memory Mem2, as shown in FIG. 4B. On the other hand, charges generated in the PD in accordance with the reflected light LRef which has entered each unit pixel 200 in the period Acc_M1 are accumulated only in the first intra-pixel memory Mem1, as shown in FIG. 4C.

As described above, the operation of the solid-state image sensor in the accumulation period Acc is synchronized with the light emission control pulse PLight and driven by the aforementioned driving patterns. This makes it possible to change the transfer destination of the charges generated by reflected light on a time basis only by controlling the second transfer switch MTx2. That is, this makes it possible to differentiate the period in which the charges generated in the PD are transferred to the first intra-pixel memory Mem1 from the period in which the charges are transferred to the second intra-pixel memory Mem2.

A method of controlling the solid-state image sensor in the readout period RO shown in FIG. 3A will now be described.

FIG. 2C is the timing chart showing the driving patterns of each driving pulse supplied to each unit pixel 200 of the solid-state image sensor and the light emission control pulse PLight supplied to the light emitting apparatus 16 in a readout period RO_i of the pixel group on the ith row out of the readout period RO. Assume that the subscript i after each pulse name shown in FIG. 2C indicates the driving pulse supplied to the unit pixel 200_i on the ith row, as in FIG. 2A. Assume that in the readout period RO, the readout operations RO_i of the signal from the pixel group on the ith row are performed sequentially for each row on pixels for M rows in a readout target area.

At time t1101, the selection pulse PSel_i is set at H level, the selection switch MSel is set in the ON state, and a signal output node of the pixel group on the ith row is connected to the vertical output line VL corresponding to each pixel column. At time t1102, the reset pulse PRes_i is set at L level, the reset switch MRes is set in the OFF state, and the reset state of the FD portion is canceled. At time t1103, a signal level transmitted from the pixel group on the ith row via the selection switch MSel and the vertical output line VL is sampled and held in the column memory in the column circuit 203 at the subsequent stage as a second reference signal N2.

At time t1104, the third transfer pulse PTx3_i is set at H level, the third transfer switch MTx3 is set in the ON state, and the charges Q2 held in the second intra-pixel memory Mem2 are transferred to the FD portion. At time t1105, the third transfer pulse PTx3_i is set at L level, the third transfer switch MTx3 is set in the OFF state, and transfer of the signal charges Q2 held in the second intra-pixel memory Mem2 to the FD portion is terminated.

At time t1106, the signal level transmitted from the pixel group on the ith row via the selection switch MSel and the vertical output line VL is sampled and held in the column memory in the column circuit 203 at the subsequent stage as a second light signal S2. At time t1107, the reset pulse PRes_i is set at H level, the reset switch MRes is set in the ON state, and the signal charges accumulated in the second intra-pixel memory Mem2 and the FD are reset.

At time t1108, the reset pulse PRes_i is set at L level, the reset switch MRes is set in the OFF state, and the reset state of the FD portion is canceled. At time t1109, the signal level transmitted from the pixel group on the ith row via the selection switch MSel and the vertical output line VL is sampled and held in the column memory in the column circuit 203 at the subsequent stage as a first reference signal N1.

At time t1110, the second transfer pulse PTx2_i is set at H level and the second transfer switch MTx2 is set in the ON state. Furthermore, the third transfer pulse PTx3_i is set at H level, the third transfer switch MTx3 is set in the ON state, and the charges Q1 held in the first intra-pixel memory Mem1 are transferred to the FD portion via the second transfer switch MTx2 and the third transfer switch MTx3.

At time 1111, the second transfer pulse PTx2_i is set at L level and the second transfer switch MTx2 is set in the OFF state. Furthermore, the third transfer pulse PTx3_i is set at L level, the third transfer switch MTx3 is set in the OFF state, and transfer of the charges Q1 held in the first intra-pixel memory Mem1 to the FD portion is terminated.

At time t1112, the signal level transmitted from the pixel group on the ith row via the selection switch MSel and the vertical output line VL is sampled and held in a column memory (not shown) in the column circuit 203 at the subsequent stage as a first light signal S1. At time t1113, the selection pulse PSel_i is set at L level, the selection switch MSel is set in the OFF state, and the connection of the signal output node of the pixel group on the ith row to the vertical output line VL is canceled.

Note that each of the signals N1, N2, S1, and S2 held in the column memory in the column circuit 203 by the above-described operation is transferred to a signal processing circuit 7 via the CDS 3 and an A/D 4. The method of controlling the solid-state image sensor in the readout period RO_i of the pixel group on the ith row in the readout period RO has been described above. Assume that the above-described operation is performed repeatedly until completion of signal readout from the pixels for the M rows in the readout target area while causing a selected row i to transition from the first row to the Mth row.

In the first embodiment, each of the first transfer switch MTx1 and the second transfer switch MTx2 is kept in the ON state from time 1002 to time t1003 in the operation in the Acc_M2 period shown in FIG. 2B. The charges generated in the PD are transferred to and then accumulated in the first and the second intra-pixel memories.

However, this driving may transfer charges to the first intra-pixel memory Mem1 and the second intra-pixel memory Mem2 by, for example, temporarily setting the first transfer switch MTx1 in the OFF state at the same time as or after time t1002 and accumulating the charges in the PD, and then setting the first transfer switch MTx1 in the ON state again before time t1003. Alternatively, this driving may transfer charges to the intra-pixel memories by temporarily setting the second transfer switch MTx2 in the OFF state at the same time as or after time t1002 and accumulating the charges in the first intra-pixel memory Mem1, and then setting the second transfer switch MTx2 in the ON state again before time t1003.

Alternatively, this driving may transfer charges to the intra-pixel memories by temporarily setting both of the first transfer switch MTx1 and the second transfer switch MTx2 in the OFF states at the same time as or after time t1002 and accumulating the charges in the PD, and then setting the first transfer switch MTx1 and the second transfer switch MTx2 in the ON states again before time t1003. Note that an operation before time t1002 and after time t1003 can be performed in accordance with the driving patterns described in the first embodiment.

<Calculation Method of Distance Information>

A method of calculating the distance from the image capturing apparatus to the object will now be described using the obtained signals N1, N2, S1, and S2. In this embodiment, calculation to be described below can be performed using the signal processing circuit 7 shown in FIG. 1A.

First, assume that the capacitance of the first intra-pixel memory Mem1 is C1, the capacitance of the second intra-pixel memory Mem2 is C2, and the capacitance of the FD is Cf. At this time, letting Q1 be the charges generated in the PD in the accumulation period Acc_M2 shown in FIG. 2B, the charges Q1 are given using the signals N2 and S2 by:

$$Q1=(C1+C2+Cf)*(S2-N2) \quad (1)$$

Further, letting Q2 be the charges generated in the PD in the accumulation period Acc_M1, the charges Q2 are given using the signals N1, S1, N2, and S2 by:

$$Q2=(C1+C2+Cf)*(S1-N1)-C1*(S2-N2) \quad (2)$$

A charge ratio R as the ratio of the charges generated in the accumulation period Acc_M1 to the total sum of the charges generated in the accumulation period Acc can be given by:

$$R=Q2/(Q1+Q2) \quad (3)$$

Let u12 be the lighting time of the light emitting apparatus 16 in the accumulation period Acc_M2 (the period in which the PLight is set at H level) and u1 be the lighting time of the light emitting apparatus 16 in the accumulation period Acc_M1 (the period in which the PLight is set at H level). Also, let W be the lighting time of the light emitting apparatus 16 in the accumulation period Acc (the total sum of the PLight in an H period). At this time, a light emission time ratio U serving as the ratio of the lighting time u1 of the light emitting apparatus 16 in the accumulation period Acc_M1 to the lighting time W of the light emitting apparatus 16 in the accumulation period Acc can be given by:

$$U=u1/W=u1/(u12+u1) \quad (4)$$

Letting $\Delta T$[s] be a flight time of light from projecting pulsed light on the object and reflected by it, the relationship between the charge ratio R and the flight time of light $\Delta T$ can be given using the light emission time ratio U and a lighting time W[s] of the light emitting apparatus 16 in the accumulation period Acc by:

$$R=1/W*\Delta T+U \quad (5)$$

As shown in equation (5), the charge ratio R is proportional to the reciprocal of the lighting time W and the light emission time ratio U becomes an offset. In this embodiment, the period u1 in which the PLight is set at H level in the accumulation period Acc_M1 is 0, and thus the light emission time ratio U is also 0. Therefore, equation (5) can be rewritten into:

$$R=1/W*\Delta T \quad (5\text{-}1)$$

Furthermore, letting L[m] be a distance to the object, the relationship between the flight time of light $\Delta T$ and the distance L to the object can be given using a speed of light c[m/s] by:

$$(6) \quad \Delta T=2L/c$$

From equations (5-1) and (6), the distance L to the object can be obtained using the charge ratio R by:

$$L=Wc/2*R \quad (7)$$

It is possible to obtain the distance information for each pixel using the signals N1, N2, S1, and S2 from the solid-state image sensor in the image capturing apparatus by performing calculation from equations (1) to (7) described above by the signal processing circuit 7.

<Driving Pattern of Solid-State Image Sensor when Obtaining Normal Image>

The driving pattern of the solid-state image sensor when obtaining a normal image without including the distance information will now be described with reference to timing charts shown in FIGS. 5A and 5B. Note that this driving pattern is the same as the driving pattern when obtaining the distance image in that, as shown in FIG. 3A, the reset operations in the reset period Res and the signal accumulation operations in the accumulation period Acc are performed simultaneously for all the pixels and then the readout operations RO_i on the respective rows are performed sequentially in the readout period RO.

When obtaining the normal image without the need to obtain the distance information, both of the two intra-pixel memories Mem1 and Mem2 can be used to accumulate the pixel signals simultaneously in both of the memories. This is because the signals having different accumulation times need not be obtained in the same unit pixel when the distance information is unnecessary.

Figure 5A:
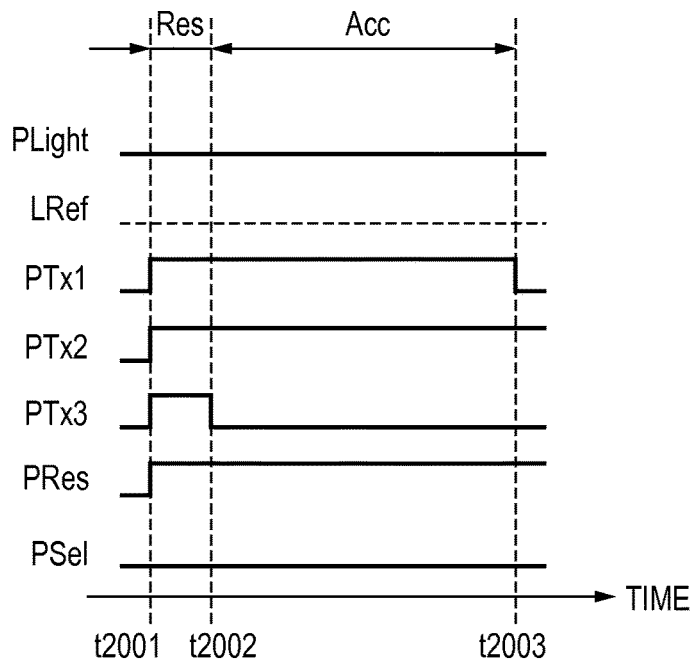
FIGS. 5A and 5B are timing charts when obtaining a normal image according to the first embodiment of the present invention.
Figure 5B:
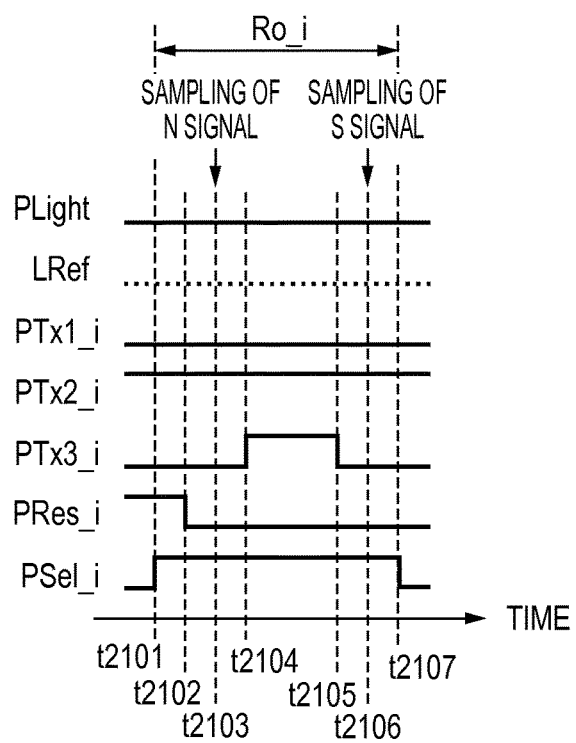

FIG. 5A is the timing chart showing the driving patterns of each driving pulse supplied to each unit pixel 200 of the solid-state image sensor and the light emission control pulse PLight supplied to the light emitting apparatus 16 in the reset period Res and the accumulation period Acc shown in FIG. 3A. A description will be made assuming that the light emission control pulse PLight is fixed in an L state and the light emitting apparatus 16 does not perform light projection because the distance information need not be obtained in the normal image.

First, a method of controlling the solid-state image sensor in the reset period Res will be described. At time t2001, the reset pulse PRes, the first transfer pulse PTx1, the second transfer pulse PTx2, and the third transfer pulse PTx3 are set at H level. At this time, the reset switch MRes, the first transfer switch MTx1, the second transfer switch MTx2, and the third transfer switch MTx3 are set in the ON states, and the charges accumulated in the PD, the first intra-pixel memory Mem1, the second intra-pixel memory Mem2, and the FD are reset.

At time t2002, the third transfer pulse PTx3 is set at L level and the third transfer switch MTx3 is set in the OFF state. Therefore, the reset states of the PD, the first intra-pixel memory Mem1, and the second intra-pixel memory Mem2 are canceled, and the reset state of the FD is continued. The method of controlling the solid-state image sensor in the reset period Res has been described above.

Next, a method of controlling the solid-state image sensor in the accumulation period Acc will be described. At time t2002, the first transfer pulse PTx1 and the second transfer pulse PTx2 are set at H level, and the charges generated in the PD are transferred to and then accumulated in the first intra-pixel memory Mem1 and the second intra-pixel memory Mem2.

At time t2003, the first transfer pulse PTx1 is set at L level, the first transfer switch MTx1 is set in the OFF state, and charge transfer from the PD to the first intra-pixel memory Mem1 and the second intra-pixel memory Mem2 is terminated. The charges that have been accumulated at this point of time are held in a combined capacitance of the first intra-pixel memory Mem1 and the second intra-pixel memory Mem2. The method of controlling the solid-state image sensor in the accumulation period Acc has been described above.

A method of controlling the solid-state image sensor in the readout period RO shown in FIG. 3A will now be described. FIG. 5B is the timing chart showing the driving patterns of each driving pulse supplied to each unit pixel 200 of the solid-state image sensor and the light emission control pulse PLight supplied to the light emitting apparatus 16 in the readout period RO_i of the pixel group on the ith row out of the readout period RO.

At time t2101, the selection pulse PSel_i is set at H level, the selection switch MSel is set in the ON state, and the signal output node of the pixel group on the ith row is connected to the vertical output line VL corresponding to each pixel column. At time t2102, the reset pulse PRes_i is set at L level, the reset switch MRes is set in the OFF state, and the reset state of the FD portion is canceled.

At time t2103, the signal level transmitted from the pixel group on the ith row via the selection switch MSel and the vertical output line VL is sampled and held in the column memory in the column circuit 203 at the subsequent stage as a reference signal N. At time t2104, the third transfer pulse PTx3_i is set at H level, the third transfer switch MTx3 is set in the ON state, and the charges held in the combined capacitance of the first intra-pixel memory Mem1 and the second intra-pixel memory Mem2 are transferred to the FD portion.

At time t2105, the third transfer pulse PTx3_i is set at L level, the third transfer switch MTx3 is set in the OFF state, and transfer of the charges held in the combined capacitance of the first intra-pixel memory Mem1 and the second intra-pixel memory Mem2 to the FD portion is terminated. At time t2106, the signal level transmitted from the pixel group on the ith row via the selection switch MSel and the vertical output line VL is sampled and held in the column memory (not shown) in the column circuit 203 at the subsequent stage as a light signal S.

At time t2107, the selection pulse PSel_i is set at L level, the selection switch MSel is set in the OFF state, and the connection of the signal output node of the pixel group on the ith row to the vertical output line VL is canceled. Each of the signals N and S held in the column memory (not shown) in the column circuit 203 by the above-described operation is transferred to the signal processing circuit 7 via the CDS 3 and an A/D 4.

The method of controlling the solid-state image sensor in the readout period RO_i of the pixel group on the ith row in the readout period RO has been described above. Assume that the above-described operation is performed repeatedly until completion of the signal readout from the pixels for the M rows in the readout target area while causing the selected row i to transition from the first row to the Mth row.

The first embodiment of the present invention has been described above. As described above, this embodiment makes it is possible, when transferring the charges generated by the reflected light, to differentiate the period in which the charges are transferred to the first intra-pixel memory Mem1 from the period in which the charges are transferred to the second intra-pixel memory Mem2 only by control of the second transfer switch MTx2 provided between the first intra-pixel memory Mem1 and the second intra-pixel memory Mem2 and operated in synchronism with the light emitting apparatus. It is therefore possible to provide the solid-state image sensor capable of obtaining accurate distance information without being influenced by variations in the transfer pulses and the transfer switches.

Modification of First Embodiment

In the first embodiment, the first intra-pixel memory Mem1 and the second intra-pixel memory Mem2 have the same impurity concentration in consideration of the simplification of a step of forming the pixel portion in a process of manufacturing the solid-state image sensor. As the impurity concentration is the same, so a potential depth is the same. As a result, charge capacitive division is generated between the first intra-pixel memory and the second intra-pixel memory. Taking this into account, distance information calculation in the first embodiment uses the signals S1, S2, N1, and N2, and coefficients $\alpha$ and $\beta$ to calculate signal levels Sq1 and Sq2, and obtains the distance information for each pixel. With this method, however, the number of calculation steps increases, resulting in a cumbersome signal process. In addition, the number of steps increases because the coefficients $\alpha$ and $\beta$ are obtained and stored before shipment of the image capturing apparatus, and a memory capacity for storing the coefficients $\alpha$ and $\beta$ is needed.

In view of this, this modification is assumed to adopt an arrangement in which the charges in the first intra-pixel memory Mem1 can completely be transferred to the second intra-pixel memory Mem2.

Figure 6A:
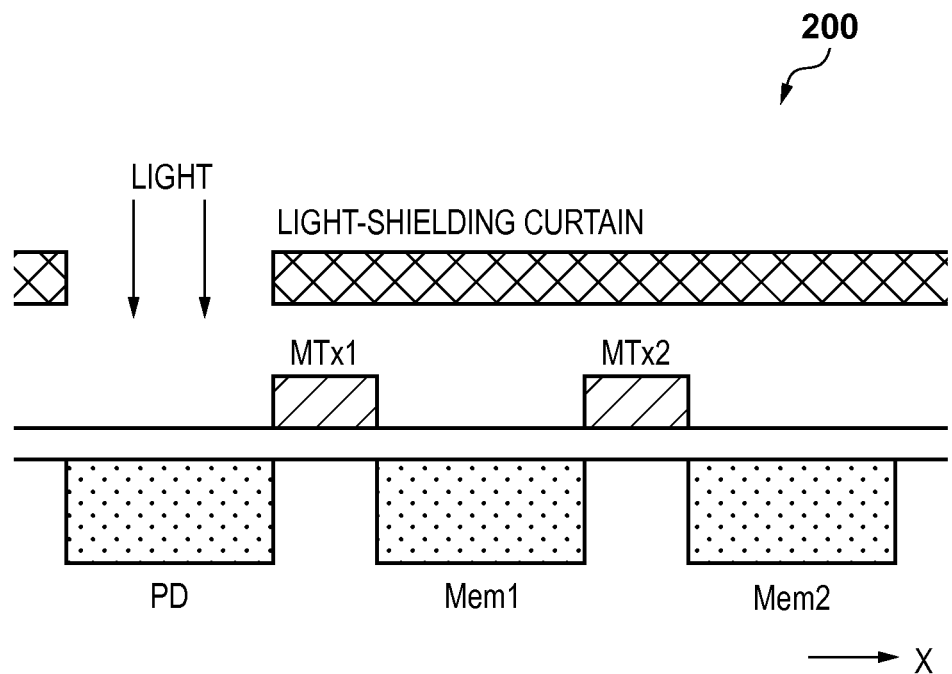
FIGS. 6A and 6B are a sectional view and a potential view of the unit pixel according to a modification of the first embodiment of the present invention.

FIG. 6A is a sectional view of the unit pixel 200 whose equivalent circuit diagram is shown in FIG. 2A. On the other hand, FIG. 6B corresponds to the sectional view shown in FIG. 6A, and is a potential view showing the potentials of the photoelectric conversion element PD, the transfer switch MTx1, the intra-pixel memory Mem1, the transfer switch MTx2, and the intra-pixel memory Mem2 in this embodiment.

Figure 6B:
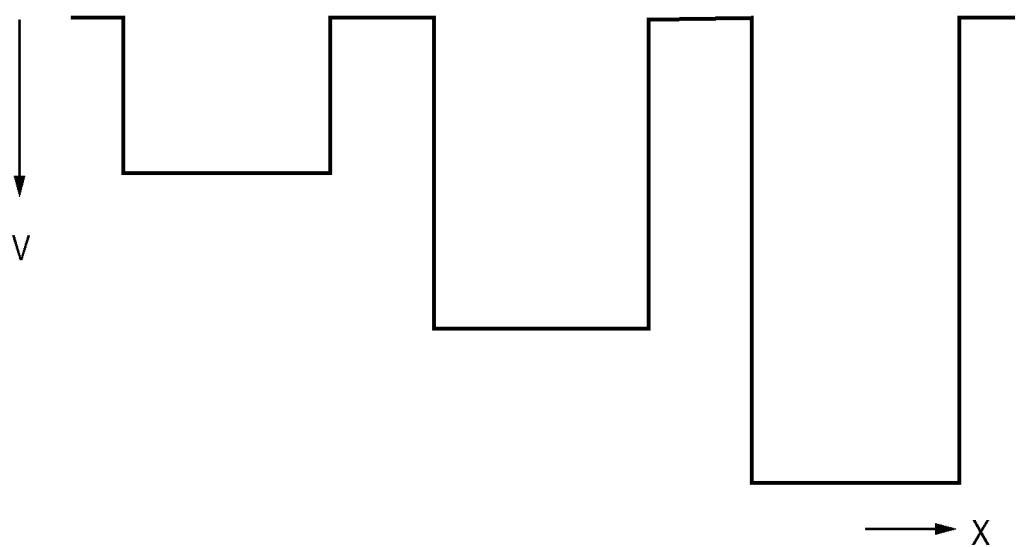

In this modification, different impurity concentrations are used to form the first and the second intra-pixel memories Mem1 and Mem2 such that their potential depths become Mem1<Mem2 as shown in FIG. 6B.

When adopting this arrangement, the conversion operations of equations (1) and (2) shown in the first embodiment using a capacitance ratio become unnecessary, and the charge ratio R can be obtained using the signals N1, N2, S1, and S2 by:

$$R=(S1-N1)/((S1-N2)+(S2-N2)) \qquad (8)$$

As described above, according to this modification, while the number of steps in the process of manufacturing the solid-state image sensor increases, calculation needed when obtaining the distance information can be simplified, as compared with the first embodiment. Furthermore, the number of steps for obtaining and storing the coefficients $\alpha$ and $\beta$ before shipment of the image capturing apparatus is reduced, and the memory capacity for storing the coefficients $\alpha$ and $\beta$ becomes unnecessary.

Second Embodiment

In the second embodiment of the present invention, charges generated in a photoelectric conversion element PD are accumulated using a first intra-pixel memory Mem11 and a second intra-pixel memory Mem21 provided in parallel to the PD in a unit pixel.

At this time, a transfer switch MTx21 provided between the PD and the second intra-pixel memory Mem21 is on/off-controlled while turning on a transfer switch MTx11 provided between the PD and the first intra-pixel memory Mem11. This differentiates a period in which charges are transferred to the first intra-pixel memory Mem11 from a period in which charges are transferred to the second intra-pixel memory Mem21.

In an arrangement according to this embodiment, the area of the PD per unit pixel decreases as a result of the increased numbers of elements and wiring lines needed for a pixel area, and the sensitivity of the solid-state image sensor decreases, as compared with the arrangement according to the first embodiment. On the other hand, the arrangement according to this embodiment can shorten a time for reading out a signal because it includes the parallel read paths of signals after the PD and can perform a readout operation at a higher frame rate than in the first embodiment. The arrangement of the unit pixel of the solid-state image sensor and a method of driving the solid-state image sensor according to the second embodiment of the present invention will be described below with reference to the accompanying drawings.

<Arrangement of Unit Pixel>

Figure 7A:
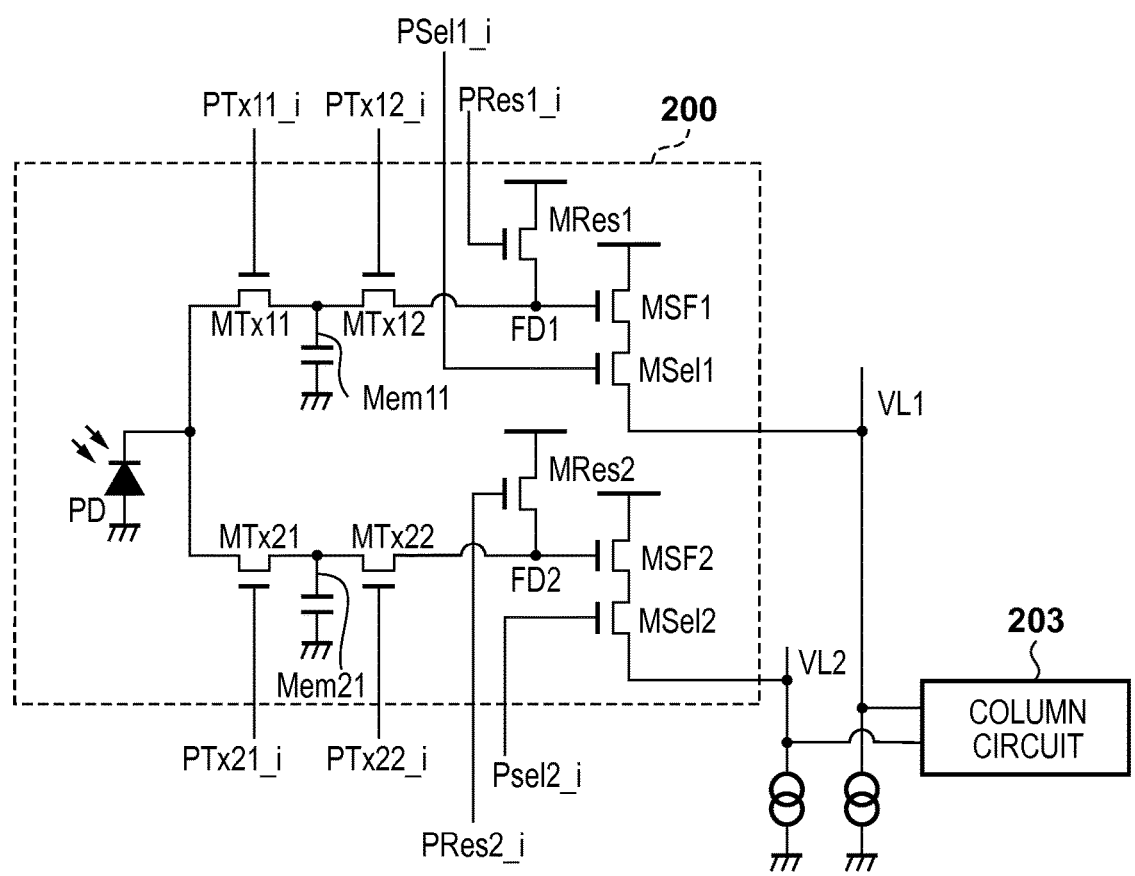
FIGS. 7A to 7C are an equivalent circuit diagram of the unit pixel of a solid-state image sensor and timing charts showing a method of driving the solid-state image sensor when obtaining a distance image according to the second embodiment of the present invention.

FIG. 7A is an equivalent circuit drawing showing the arrangement of a unit pixel 200 of the solid-state image sensor according to the second embodiment of the present invention. The photoelectric conversion element PD receives incident light, and generates and accumulates signal charges corresponding to a receiving amount of that light. The intra-pixel memory Mem11 (first charge holding portion) and the intra-pixel memory Mem21 (second charge holding portion) provided in parallel to the PD hold charge signals generated in the photoelectric conversion element PD. The transfer switch MTx11 (first charge transfer portion) controls transfer of the signal charges generated in the photoelectric conversion element PD to the first intra-pixel memory Mem11. Furthermore, the transfer switch MTx21 (second charge transfer portion) controls transfer of the signal charges generated in the photoelectric conversion element PD to the second intra-pixel memory Mem21.

Assume that each of the first and the second intra-pixel memories adopts, by generating a buried capacitor or the like, an arrangement unsusceptible to noise such as a dark current in order to achieve "global electronic shutter driving" to be described later even if long-term charge accumulation is performed.

A floating diffusion (FD) portion 1 (third charge holding portion) holds charges transferred via the first intra-pixel memory Mem11. Furthermore, a floating diffusion (FD) portion 2 (fourth charge holding portion) holds charges transferred via the second intra-pixel memory Mem21. A transfer switch MTx12 (third charge transfer portion) controls charge transfer from the first intra-pixel memory Mem11 to the FD portion 1. Furthermore, a transfer switch MTx22 (fourth charge transfer portion) controls charge transfer from the second intra-pixel memory Mem21 to the FD2. A reset switch MRes1 (first reset portion) is connected to the FD1, and resets signal charges held in the FD1, the first intra-pixel memory Mem11, and the PD. Furthermore, a reset switch MRes2 (second reset portion) is connected to the FD2, and resets signal charges held in the FD2, the second intra-pixel memory Mem21, and the PD. An amplifier MOS MSF1 (first conversion/amplification portion) is connected to a current source provided for each vertical output line VL1, forms a source follower circuit, and outputs a voltage signal as a pixel signal in accordance with the charges held in the FD1. Furthermore, an amplifier MOS MSF2 (second conversion/amplification portion) is connected to a current source provided for each vertical output line VL2, forms a source follower circuit, and outputs a voltage signal as a pixel signal in accordance with the charges held in the FD2. A selection switch MSel1 (first selection portion) controls a connection between the signal output node of the amplifier MOS MSF1 and the vertical output line VL1 provided for each pixel column, and selects a pixel group i which transmits, via the vertical output line VL1, the voltage signal output from the amplifier MOS MSF1 to a column circuit 203 at the subsequent stage. Furthermore, a selection switch MSel2 (second selection portion) controls a connection between the signal output node of the amplifier MOS MSF2 and the vertical output line VL2 provided for each pixel column, and selects the pixel group i which transmits, via the vertical output line VL2, the voltage signal output from the amplifier MOS MSF2 to a column circuit 203 at the subsequent stage.

Each above-described switch provided in the unit pixel 200 is controlled by each driving pulse supplied from a vertical scanning circuit 202. For example, the transfer switch MTx11 is controlled by a first transfer pulse PTx11_i. The transfer switch MTx21 is controlled by a second transfer pulse PTx21_i. The transfer switch MTx12 is controlled by a third transfer pulse PTx12_i. The transfer switch MTx22 is controlled by a fourth transfer pulse PTx22_i. Also, the reset switch MRes1 is controlled by a reset pulse PRes1_i and the reset switch MRes2 is controlled by a reset pulse PRes2_i. The selection switch MSel1 is controlled by a selection pulse PSel1_i and the selection switch MSel2 is controlled by a selection pulse PSel2_i.

Assume that a subscript i after each pulse name indicates a driving pulse supplied to a unit pixel 200_i on the ith row in the solid-state image sensor including the unit pixels arranged in a matrix.

<Driving Patterns of Solid-State Image Sensor and Light Emitting Apparatus when Obtaining Distance Image>

Figure 7B:
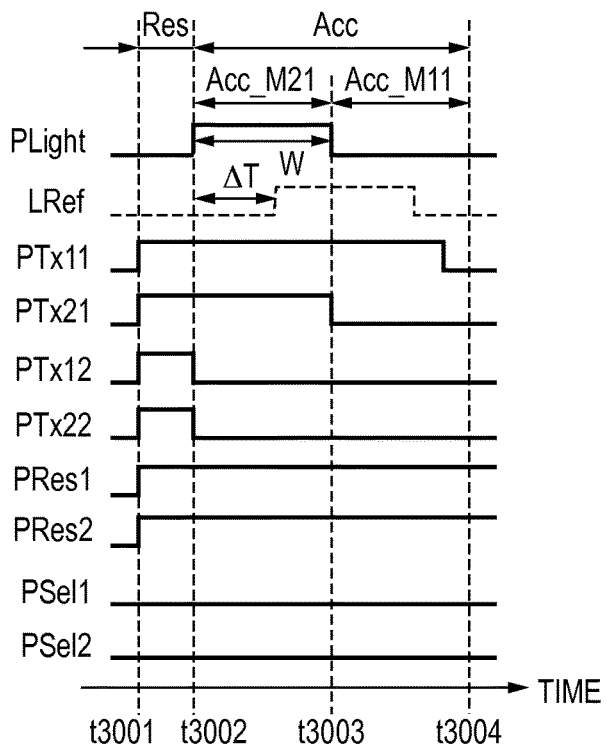
Figure 7C:
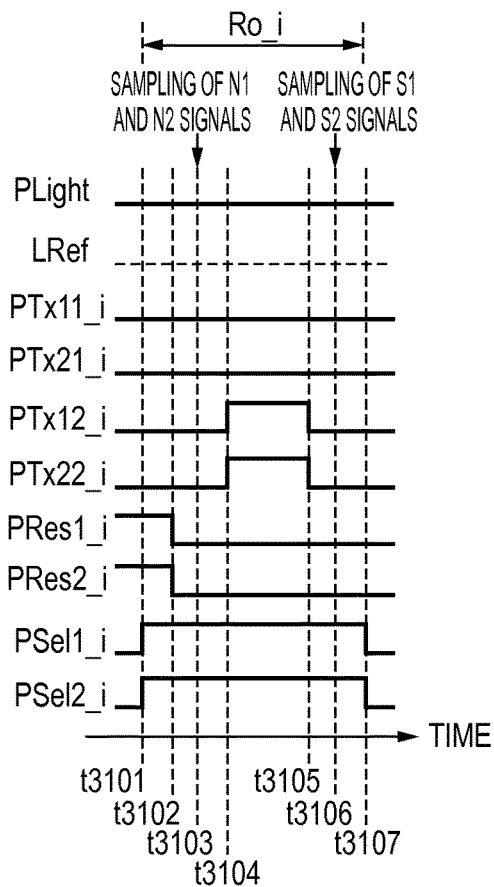

The driving patterns of the solid-state image sensor and a light emitting apparatus when obtaining a distance image will now be described with reference to timing charts shown in FIGS. 7B and 7C. FIGS. 7B and 7C are the timing charts of respective driving pulses supplied to each unit pixel 200 of the solid-state image sensor and a light emitting apparatus 16 when obtaining the distance image.

As in FIG. 7A, assume that the subscript i after each pulse name shown in FIGS. 7B and 7C indicates the driving pulse supplied to the unit pixel 200_i on the ith row in the solid-state image sensor including the unit pixels arranged in a matrix. A description will be made assuming that each switch is set in an ON state when each driving pulse is set at H level, while each switch is set in an OFF state when each driving pulse is set at L level.

FIG. 7B is the timing chart showing the driving patterns of each driving pulse supplied to each unit pixel 200 of the solid-state image sensor and a light emission control pulse PLight supplied to the light emitting apparatus 16 in a reset period Res and an accumulation period Acc. Assume that the operations in the reset period Res and the accumulation period Acc are performed simultaneously not only for pixels belonging to a pixel group on the ith row but also for pixels belonging to a pixel group on a row other than the ith row.

First, a method of controlling the solid-state image sensor in the reset period Res will be described. At time t3001, a first reset pulse PRes1_i, a second reset pulse PRes2_i, the first transfer pulse PTx11_i, the second transfer pulse PTx21_i, the third transfer pulse PTx12_i, and the fourth transfer pulse PTx22_i are set at H level. At this time, the first reset switch MRes1, the second reset switch MRes2, the first transfer switch MTx11, the second transfer switch MTx21, the third transfer switch MTx12, and the fourth transfer switch MTx22 are set in the ON states. Then, charges accumulated in the PD, the first intra-pixel memory Mem11, the second intra-pixel memory Mem12, the FD1, and the FD2 are reset.

At time t3002, the third transfer pulse PTx21_i and the fourth transfer pulse PTx22_i are set at L level, and the third transfer switch MTx21 and the fourth transfer switch MTx22 are set in the OFF states. Therefore, the reset states of the PD, the first intra-pixel memory Mem11, and the second intra-pixel memory Mem21 are canceled, and the reset states of the FD1 and the FD2 are continued. The method of controlling the solid-state image sensor in the reset period Res has been described above.

Next, a method of controlling the solid-state image sensor in the accumulation period Acc will be described. At time t3002, the first transfer pulse PTx11_i and the second transfer pulse PTx21_i are set at H level, and the charges generated in the PD are transferred to and then accumulated in the first intra-pixel memory Mem11 and the second intra-pixel memory Mem21. A period in which charges are transferred from the PD to both of the first intra-pixel memory Mem11 and the second intra-pixel memory Mem21 will be referred to as Acc_M21 hereinafter.

At time t3003, the second transfer pulse PTx21_i is set at L level, the second transfer switch MTx21 is set in the OFF state, and charge transfer to the second intra-pixel memory Mem21 is terminated. Then, charges Q21 that have been accumulated at this point of time are held in the second intra-pixel memory Mem21. Note that the first transfer pulse PTx11_i is kept at H level and charge transfer to the first intra-pixel memory Mem11 is continued. A period in which charges are transferred from the PD to only the first intra-pixel memory Mem11 will be referred to as Acc_M11 hereinafter.

At time t3004, the first transfer pulse PTx11_i is set at L level, the first transfer switch MTx11 is set in the OFF state, and charge transfer to the first intra-pixel memory Mem11 is terminated. Then, charges Q11 that have been accumulated at this point of time are held in the first intra-pixel memory Mem11. The method of controlling the solid-state image sensor in the accumulation period Acc has been described above.

During the accumulation period Acc, control of the solid-state image sensor and the light projection operation of the light emitting apparatus 16 shown in FIG. 1B are performed in synchronism with each other, as in the first embodiment. More specifically, in the period Acc_M11 when charge transfer to the second intra-pixel memory Mem21 is terminated and signal charges are only transferred to the first intra-pixel memory Mem11, light projection from the light emitting apparatus is not performed. On the other hand, during the period Acc_M21, before the period Acc_M11, when signal charges are transferred to both of the intra-pixel memories Mem11 and Mem21, light projection from the light emitting apparatus is performed.

The period Acc_M21 is terminated at a timing, for example, after the light emitting apparatus 16 starts light projection and before the light emitting apparatus 16 terminates light projection. In this embodiment, a period between time t3002 and time t3003 corresponding to the period Acc_M21 is defined as the H level period of the light emission control pulse PLight supplied to the light emitting apparatus 16 and the light emission control pulse PLight is set at L level in a period other than that period, as shown in FIG. 7B. While the light emission control pulse PLight is at H level, light projection is performed from the light emitting apparatus 16 to an object and the light projection is terminated at the moment when the light emission control pulse PLight is set at L level.

Light projected from the light emitting apparatus 16 is reflected by the object and enters each unit pixel 200 of the solid-state image sensor via an imaging optical system 1 of an image capturing apparatus after a delay time ΔT corresponding to a distance L from the image capturing apparatus to the object. Reflected light LRef in FIG. 7B shows an example of a timing when reflected light from the object enters each unit pixel 200. Charges generated in the PD in accordance with the reflected light LRef which has entered each unit pixel 200 in the period Acc_M21 are accumulated in both of the first intra-pixel memory Mem11 and the second intra-pixel memory Mem21. On the other hand, charges generated in the PD in accordance with the reflected light LRef which has entered each unit pixel 200 in the period Acc_M11 are accumulated only in the first intra-pixel memory Mem11. That is, it is possible to differentiate a period in which the charges generated in the PD are transferred to the first intra-pixel memory Mem11 from a period in which the charges are transferred to the second intra-pixel memory Mem21.

As described above, the operation of the solid-state image sensor in the accumulation period Acc is synchronized with the light emission control pulse PLight and driven by the aforementioned driving patterns. This makes it possible to change the transfer destination of the charges generated by reflected light on a time basis only by controlling the second transfer switch MTx21.

A method of controlling the solid-state image sensor in a readout period RO will now be described. FIG. 7C is the timing chart showing the driving patterns of each driving pulse supplied to each unit pixel 200 of the solid-state image sensor and the light emission control pulse PLight supplied to the light emitting apparatus 16 in a readout period RO_i of the pixel group on the ith row out of the readout period RO. Assume that in the readout period RO, the readout operations RO_i of the signal from the pixel group on the ith row are performed sequentially for each row on pixels for M rows in a readout target area.

At time t3101, the first selection pulse PSel1_i, the second selection pulse PSel2_i are set at H level, and the first selection switch MSel1 and the second selection switch MSel2 are set in the ON states. Therefore, a signal output node of the pixel group on the ith row is connected to the vertical output lines VL1 and VL2 corresponding to each pixel column.

At time t3102, the first reset pulse PRes1_i and the second reset pulse PRes2_i are set at L level, the first reset switch MRes 1 and the second reset switch MRes2 are set in the OFF states, and the reset states of the FD portion 1 and the FD portion 2 are canceled.

At time t3103, a signal output from the amplifier MOS MSF1 in the pixel group on the ith row via the first selection switch MSel1 and the vertical output line VL1 is sampled and held in a column memory in the column circuit 203 at the subsequent stage as a second reference signal N2. Furthermore, a signal output from the amplifier MOS MSF2 in the pixel group on the ith row via the second selection switch MSel2 and the vertical output line VL2 is sampled and held in a column memory in the column circuit 203 at the subsequent stage as a first reference signal N1.

At time t3104, the third transfer pulse PTx12_i and the fourth transfer pulse PTx22_i are set at H level, and the third transfer switch MTx12 and the fourth transfer switch MTx22 are set in the ON states. Therefore, the charges Q11 held in the first intra-pixel memory Mem11 are transferred to the FD portion 1 and the charges Q21 held in the second intra-pixel memory Mem21 are transferred to the FD portion 2.

At time t3105, the third transfer pulse PTx12_i is set at L level, the third transfer switch MTx12 is set in the OFF state, and transfer of the charges Q11 held in the first intra-pixel memory Mem11 to the FD portion 1 is terminated. Furthermore, the fourth transfer pulse PTx22_i is set at L level, the fourth transfer switch MTx22 is set in the OFF state, and transfer of the charges Q21 held in the second intra-pixel memory Mem21 to the FD portion 2 is terminated.

At time t3106, the signal output from the amplifier MOS MSF1 in the pixel group on the ith row via the first selection switch MSel1 and the vertical output line VL1 is sampled and held in the column memory in the column circuit 203 at the subsequent stage as a second light signal S2. Furthermore, the signal output from the amplifier MOS MSF2 in the pixel group on the ith row via the second selection switch MSel2 and the vertical output line VL2 is sampled and held in the column memory in the column circuit 203 at the subsequent stage as a first light signal S1.

At time t3107, the first selection pulse PSel1_i and the second selection pulse PSel2_i are set at L level, the first selection switch MSel1 and the second selection switch MSel2 are set in the OFF states, and the connection of the signal output node of the pixel group on the ith row to the vertical output lines VL1 and VL2 is canceled. Each of the signals N1, N2, S1, and S2 held in the column memory in the column circuit 203 by the above-described operation is transferred to the signal processing circuit 7 via a CDS 3 and an A/D 4.

The method of controlling the solid-state image sensor in the readout period RO_i of the pixel group on the ith row in the readout period RO has been described above. Assume that the above-described operation is performed repeatedly until completion of the signal readout from the pixels for the M rows in the readout target area while causing the selected row i to transition from the first row to the Mth row.

<Calculation Method of Distance Information>

The calculation procedure of distance information from the image capturing apparatus to the object using the obtained signals N1, N2, S1, and S2 is as follows.

Assume that the capacitance of the second intra-pixel memory Mem21 is C21 and the capacitance of the FD portion 2 is Cf2. Also assume that the capacitance of the first intra-pixel memory Mem11 is C11 and the capacitance of the FD portion 1 is Cf1. At this time, letting Q1 be the charges generated in the PD in the accumulation period Acc_M21 shown in FIG. 2B, the charges Q1 are given using the signals N2 and S2 by:

$$Q1=(C11+C21+Cf2)*(S2-N2) \quad (9)$$

Further, charges Q2 are given using the signals N1, S1, N2, and S2 by:

$$Q2=(C11+C21+Cf1)*(S1-N1)-C11*(S2-N2) \quad (10)$$

The remainder of the procedure is the same as the procedure from equation (3) shown in the first embodiment.

<Driving Pattern of the Solid-State Image Sensor when Obtaining Normal Image>

When obtaining a normal image, a signal can be read out using not the second intra-pixel memory Mem21 but only the first intra-pixel memory Mem11.

More specifically, the first transfer switch MTx11, the third transfer switch MTx12, the first reset switch MRes1, and the first selection switch MSel1 are controlled in accordance with the timing charts shown in FIGS. 7B and 7C to perform operations in the reset period Res, the accumulation period Acc, and the readout period RO.

The second transfer switch MTx21 is fixed in the OFF state, thereby preventing charge transfer from the PD to the second intra-pixel memory Mem21. Furthermore, the first selection switch MSel2 is fixed in the OFF state, thereby preventing the signal output from the second amplifier MOS MSF2 from being read out to a column circuit. The fourth transfer switch MTx22 and the first reset switch MRes1 are always fixed in the ON states when obtaining the normal image, thereby maintaining the level of each of the FD2 and the second intra-pixel memory Mem21 in a reset state.

The second embodiment of the present invention has been described above. As described above, this embodiment makes it is possible, when transferring charges generated by reflected light, to differentiate the period in which the charges are transferred to the first intra-pixel memory Mem11 from the period in which the charges are transferred to the second intra-pixel memory Mem21 only by controlling the second transfer switch MTx21 provided between the PD and the second intra-pixel memory Mem21. It is therefore possible to provide the solid-state image sensor capable of obtaining accurate distance information without being influenced by variations in the transfer pulses and the transfer switches.

In this embodiment, the area of the PD per unit pixel decreases and the sensitivity of the solid-state image sensor decreases, as compared with the arrangement according to the first embodiment. On the other hand, this embodiment can shorten a time for reading out a signal and perform a readout operation at a higher frame rate, as compared with the first embodiment.

Modification of Second Embodiment

In the second embodiment of the present invention, the charges generated in the photoelectric conversion element PD are accumulated using the first intra-pixel memory Mem11 and the second intra-pixel memory Mem21 provided in parallel to the PD in the unit pixel.

Figure 8:
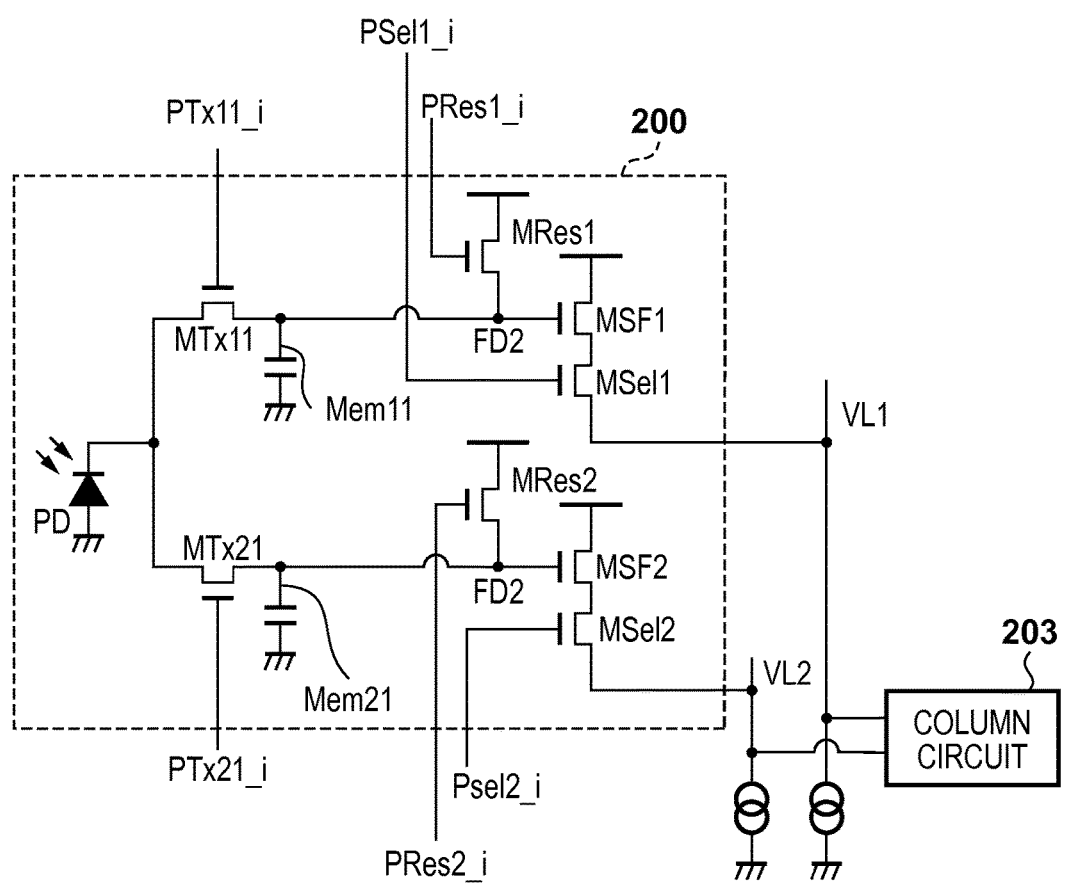
FIG. 8 is an equivalent circuit diagram of the unit pixel of the solid-state image sensor according to a modification of the second embodiment of the present invention.

Unlike this, a signal can be accumulated in the FD portion 1 instead of the first intra-pixel memory Mem11 or in the FD portion 2 instead of the second intra-pixel memory Mem21. FIG. 8 shows an equivalent circuit diagram of the unit pixel 200 according to this modification. This modification is different from the second embodiment in that out of elements which form a unit pixel, intra-pixel memories M11 and M21, the third transfer switch MTx12, the fourth transfer switch MTx22, a signal wiring for transmitting the transfer pulses PTx12_i and PTx22_i from a vertical scanning circuit are deleted.

With this arrangement, it is possible to increase the area of the PD per unit pixel as compared with the unit pixel in the second embodiment and increase the sensitivity of the solid-state image sensor. It is generally known, however, that noise such as a dark current is easily mixed in each FD portion, the influence of noise becomes large as a signal holding time in the FD portion is longer, and thus the FD portion is not suitable for holding charges for a long period of time.

The second embodiment is designed to perform "global electronic shutter driving" shown in FIG. 3A. In "global electronic shutter driving", however, since the signal readout operations are performed sequentially for each row in the readout period RO after performing the signal accumulation operations simultaneously for all the pixels, a period in which the charge signals are held inside the unit pixels becomes longer on the row having later readout order. For this reason, if "global electronic shutter driving" is performed on the solid-state image sensor having an arrangement in which the charges are accumulated in each FD portion as in this modification, the row having large noise such as a dark current is generated and it becomes difficult to obtain accurate distance information.

Therefore, in the solid-state image sensor having the arrangement as in this modification, "rolling shutter driving" which repeats the accumulation period Acc and the readout period for each row as shown in FIG. 3B is performed.

The driving patterns when obtaining the distance image in the second embodiment shown in FIGS. 7B and 7C can be applied to those in "rolling shutter driving" shown in FIG. 3B. That is, driving in the reset period Res and the accumulation period Acc shown in FIG. 7B in the pixel on the ith row can be performed in a Res_i+Acc_i period of FIG. 3B, and the operation in the RO_i period shown in FIG. 7C can be performed in the RO_i period of FIG. 3B.

Also when shooting the normal image, in "rolling shutter driving" shown in FIG. 3B, a signal can be read out using not the second intra-pixel memory Mem21 but only the first intra-pixel memory Mem11, as in the second embodiment. As described above, however, since the first intra-pixel memory M11, the second intra-pixel memory M21, the third transfer switch MTx12, and the fourth transfer switch MTx22 are omitted, the operations of the transfer pulses PTx12_i and PTx22_i can be ignored.

As described above, this modification makes it possible to differentiate the period in which the charges are transferred to the FD1 from the period in which the charges are transferred to the FD2 only by controlling the second transfer switch MTx21 provided between the PD and the FD2. It is therefore possible to provide the solid-state image sensor capable of obtaining the accurate distance information without being influenced by the variations in the transfer pulses and the transfer switches.

In this modification, "global shutter driving" cannot be performed, and simultaneity of the accumulation times of the signals in the respective pixels is not maintained. On the other hand, it is possible to increase the area of the PD per unit pixel and increase the sensitivity of the solid-state image sensor, as compared with the arrangement in the second embodiment.

The preferred embodiments of the present invention have been described above. However, the present invention is not limited to these embodiments, and various modifications and changes can be made without departing from the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075721, filed Apr. 1, 2014, which is hereby incorporated by reference herein in its entirety.

What is claimed is:

1. An image capturing apparatus comprising:
an image sensor including a pixel area where a plurality of unit pixels are arranged, each of the unit pixels including a photoelectric conversion portion configured to convert incident light into charges, a first charge holding portion, a second charge holding portion, a third charge holding portion, a first charge transfer portion provided between the photoelectric conversion portion and the first charge holding portion and configured to transfer charges accumulated in the photoelectric conversion portion to the first charge holding portion, a second charge transfer portion provided between the first charge holding portion and the second charge holding portion and configured to transfer charges held in the first charge holding portion to the second charge holding portion, and a third charge transfer portion provided between the second charge holding portion and the third charge holding portion and configured to transfer charges held in the second charge holding portion to the third charge holding portion;
a light projector which projects light to an object; and
a controller which controls said image sensor and said projector to set the second charge transfer portion in an OFF state synchronized with a light projection operation by said light projector while keeping the first charge transfer portion in an ON state after controlling the photoelectric conversion portion to perform photoelectric conversion, and setting the first charge transfer portion and the second charge transfer portion in the ON states.

2. The apparatus according to claim 1, further comprising a reset portion configured to reset the charges held in the first charge holding portion, the second charge holding portion, the third second charge holding portion, and the photoelectric conversion portion, wherein said controller controls the photoelectric conversion portion to perform photoelectric conversion, and said image sensor and said light projector to set the first charge transfer portion and the second charge transfer portion in the ON states after resetting the charges in the first charge holding portion, the second charge holding, portion, and the photoelectric conversion portion.

3. The apparatus according to claim 1, wherein a timing for setting the second charge transfer portion in the OFF state in synchronism with the light projection operation by said light projector while keeping the first transfer portion in the ON state is after a start and before an end of light projection by said light projector.

4. The apparatus according to claim 1, wherein said controller controls the second charge transfer portions to be turned off simultaneously in the plurality of pixel portions.

5. The apparatus according to claim 1, wherein a signal read out from said image sensor is used for distance information calculation.

6. An image capturing apparatus comprising:
an image sensor including a pixel area where a plurality of unit pixels are arranged, each of the unit pixels including a photoelectric conversion portion configured to convert incident light into charges, a first charge holding portion, a second charge holding portion, a third charge holding portion, a fourth charge holding portion, a first charge transfer portion provided between the photoelectric conversion portion and the first charge holding portion and configured to transfer charges accumulated in the photoelectric conversion portion to the first charge holding portion, a second charge transfer portion provided between the photoelectric conversion portion and the second charge holding portion and configured to transfer charges accumulated in the photoelectric conversion portion to the second charge holding portion, a third charge transfer portion provided between the first charge holding portion and the third charge holding portion and configured to transfer charges held in the first charge holding portion to the third charge holding portion, and a fourth charge transfer portion provided between the second charge holding portion and the fourth charge holding portion and configured to transfer charges held in the second charge holding portion to the fourth charge holding portion;
a light projector which projects light to an object; and
a controller which controls said image sensor and said projector to set the second charge transfer portion in an OFF state synchronized with a light projection operation by said light projector while keeping the first charge transfer portion in an ON state after controlling the photoelectric conversion portion to perform photoelectric conversion, and setting the first charge transfer portion and the second charge transfer portion in the ON states.

7. The apparatus according to 6, further comprising a reset portion configured to reset the charges held in the first charge holding portion, the second charge holding portion, and the photoelectric conversion portion, wherein said controller controls the photoelectric conversion portion to perform photoelectric conversion, and controls said image sensor and said light projector to set the first charge transfer portion and the second charge transfer portion in the ON states after resetting the charges in the first charge holding portion, the second charge holding portion, and the photoelectric conversion portion.

8. The apparatus according to claim 6, wherein a timing for setting the second charge transfer portion the OFF state synchronized with the light projection operation by said light projector while keeping the first charge transfer portion in the ON state is after a start and before an end of light projection by said light projector.

9. The apparatus according to claim 6, wherein said controller controls the second charge transfer portions to be turned off simultaneously in the plurality of pixel portions.

10. The apparatus according to claim 6, wherein a signal read out from said image sensor is used for distance information calculation.

11. A control method of controlling an image capturing apparatus including an image sensor including a pixel area where a plurality of unit pixels are arranged, each of the unit pixels including a photoelectric conversion portion configured to convert incident light into charges, a first charge holding portion, a second charge holding portion, a third charge holding portion, a first charge transfer portion, a second charge transfer portion and a third charge transfer portion; and a light projector, the method comprising:
controlling the image sensor and the light projector to set the second charge transfer portion in an OFF state synchronized with a light projection operation by the light projector while keeping the first charge transfer portion in an ON state after controlling the photoelectric conversion portion to perform photoelectric conversion, and setting the first charge transfer portion and the second charge transfer portion in the ON states,
wherein the first charge transfer portion is provided between the photoelectric conversion portion and the first charge holding portion and configured to transfer charges held in the photoelectric conversion portion to the first charge holding portion, the second charge transfer portion is provided between the first charge holding portion and the second charge holding portion and configured to transfer charges held in the first charge holding portion to the second charge holding portion, and the third charge transfer portion is provided between the second charge holding portion and the third charge holding portion and configured to transfer charges held in the second charge holding portion to the third charge holding portion, and wherein the light projector projects light to an object.

12. A control method of controlling an image capturing apparatus including an image sensor including a pixel area where a plurality of unit pixels are arranged, each of the unit pixels including a photoelectric conversion portion configured to convert incident light into charges, a first charge holding portion, a first charge transfer portion, a second charge transfer portion, a third charge transfer portion, and a fourth charge transfer portion; and a light projector, the method comprising:
controlling the image sensor and the light projector to set the second charge transfer portion in an OFF state synchronized with a light projection operation by the light projector while keeping the first charge transfer portion in an ON state after controlling the photoelectric conversion portion to perform photoelectric conversion, and setting the first charge transfer portion and the second charge transfer portion in the ON states,
wherein the first charge transfer portion is provided between the photoelectric conversion portion and the first charge holding portion and configured to transfer charged accumulated in the photoelectric conversion portion to the first charge holding portion, the second charge transfer portion is provided between the photoelectric conversion portion and the second charge holding portion and configured to transfer charges accumulated in the photoelectric conversion portion to the second chare holding portion, the third charge transfer portion is provided between the first charge holding portion and the third charge holding portion and configured to transfer charges held in the first charge holding portion to the third charge holding portion, and the fourth charge transfer portion is provided between the second charge holding portion and the fourth charge holding portion and configured to transfer charges held in the second charge holding portion to the fourth charge holding portion, and wherein the light projector projects light to an object.

13. A non-transitory computer-readable storage medium storing a program for causing a computer to execute a step of a control method of controlling an image capturing apparatus including an image sensor including a pixel area where a plurality of unit pixels are arranged, each of the unit pixels including a photoelectric conversion portion configured to convert incident light into charges, a first charge holding portion, a second charge holding portion, a third charge holding portion, a first charge transfer portion, a second charge transfer portion, and a third charge transfer portion; and a light projector, the method comprising:

controlling the image sensor and the light projector to set the second charge transfer portion in an OFF state synchronized with a light projection operation by the light projector while keeping the first charge transfer portion in an ON state after controlling the photoelectric conversion portion to perform photoelectric conversion, and setting the first charge transfer portion and the second charge transfer portion in the ON states, wherein the first charge transfer portion is provided between the photoelectric conversion portion and the first charge holding portion and configured to transfer charges held in the photoelectric conversion portion to the first charge holding portion, the second charge transfer portion is provided between the first charge holding portion and the second charge holding portion and configured to transfer charges held in the first charge holding portion to the second charge holding portion, and the third charge transfer portion is provided between the second charge holding portion and the third charge holding portion and configured to transfer charges held in the second charge holding portion to the third charge holding portion, and wherein the light projector projects light to an object.

14. A non-transitory computer-readable storage medium storing a program for causing a computer to execute a step of a control method of controlling an image capturing apparatus including an image sensor including a pixel area where a plurality of unit pixels are arranged, each of the unit pixels including a photoelectric conversion portion configured to convert incident light into charges, a first charge holding portion, a first charge transfer portion, a second charge transfer portion, a third charge transfer portion, and a fourth charge transfer portion; and a light projector, the method comprising:

controlling the image sensor and the light projector to set the second charge transfer portion in an OFF state synchronized with a light projection operation by the light projector while keeping the first charge transfer portion in an ON state after controlling the photoelectric conversion portion to perform photoelectric conversion, and setting the first charge transfer portion and the second charge transfer portion in the ON states, wherein the first charge transfer portion is provided between the photoelectric conversion portion and the first charge holding portion and configured to transfer charged accumulated in the photoelectric conversion portion to the first charge holding portion, the second charge transfer portion is provided between the photoelectric conversion portion and the second charge holding portion and configured to transfer charges accumulated in the photoelectric conversion portion to the second charge holding portion, the third charge transfer portion is provided between the first charge holding portion and the third charge holding portion and configured to transfer charges held in the first charge holding portion to the third charge holding portion, and the fourth charge transfer portion is provided between the second charge holding portion and the fourth charge holding portion and configured to transfer charges held in the second charge holding portion to the fourth charge holding portion, and wherein the light projector projects light to an object.

* * * * *